United States Patent
Greystoke et al.

(10) Patent No.: US 10,437,889 B2
(45) Date of Patent: Oct. 8, 2019

(54) SYSTEMS AND METHODS OF PROVIDING OUTCOMES BASED ON COLLECTIVE INTELLIGENCE EXPERIENCE

(71) Applicant: LF Technology Development Corporation Limited, London (GB)

(72) Inventors: Alexander Greystoke, Lakeway, TX (US); Shy Blick, Austin, TX (US)

(73) Assignee: LF Technology Development Corporation Limited, London (GB)

( * ) Notice: Subject to any disclaimer, the term of this patent is extended or adjusted under 35 U.S.C. 154(b) by 550 days.

(21) Appl. No.: 14/793,618

(22) Filed: Jul. 7, 2015

(65) Prior Publication Data

US 2015/0310131 A1   Oct. 29, 2015

Related U.S. Application Data

(63) Continuation-in-part of application No. 14/738,881, filed on Jun. 13, 2015, now abandoned, and a continuation-in-part of application No. 14/640,865, filed on Mar. 6, 2015, and a continuation-in-part of application No. 14/603,227, filed on Jan. 22, 2015, and a continuation-in-part of application No. 14/327,543, filed on Jul. 9, 2014, now Pat. No.
(Continued)

(51) Int. Cl.
*G06Q 30/00* (2012.01)
*G06F 16/9038* (2019.01)
*G06F 16/951* (2019.01)
*G06Q 30/06* (2012.01)

(52) U.S. Cl.
CPC ........ *G06F 16/9038* (2019.01); *G06F 16/951* (2019.01); *G06Q 30/0619* (2013.01)

(58) Field of Classification Search
CPC ................ G06Q 30/0282; G06Q 30/0631

USPC ................................. 705/26.7, 347
See application file for complete search history.

(56) References Cited

U.S. PATENT DOCUMENTS 5,097,407 A   3/1992   Hino
5,412,756 A   5/1995   Bauman
(Continued)

FOREIGN PATENT DOCUMENTS

RU        2254611        6/2005

OTHER PUBLICATIONS

PCT/US2014/046059, International Search Report, dated Apr. 2, 2015.
(Continued)

*Primary Examiner* — Mila Airapetian
(74) *Attorney, Agent, or Firm* — Cesari and Reed LLP

(57) ABSTRACT

Embodiments of a collective intelligence experience system and method may include a processor and a memory accessible to the processor. The memory may be configured to store instructions that, when executed, cause the processor to provide one or more recommended searches to an interface based on collective information and in response to input data at the interface. In some embodiments, with respect to the one or more recommended searches, the system may provide recommendations, advice, associated data, or any combination thereof. In some embodiments, the collective intelligence experience system may determine a true value of a product, a service, or information based on a context of the request at a point in time.

20 Claims, 10 Drawing Sheets

Related U.S. Application Data 10,185,917, application No. 14/793,618, which is a continuation-in-part of application No. 14/169,058, filed on Jan. 30, 2014, now Pat. No. 9,767,498, application No. 14/793,618, which is a continuation-in-part of application No. 14/169,060, filed on Jan. 30, 2014, now abandoned.

(60) Provisional application No. 61/759,314, filed on Jan. 31, 2013, provisional application No. 61/759,317, filed on Jan. 31, 2013, provisional application No. 61/844,350, filed on Jul. 9, 2013, provisional application No. 61/844,353, filed on Jul. 9, 2013, provisional application No. 61/844,355, filed on Jul. 9, 2013.

(56) References Cited

U.S. PATENT DOCUMENTS

| | | |
|---|---|---|
| 5,537,618 A | 7/1996 | Boulton et al. |
| 5,566,291 A | 10/1996 | Boulton et al. |
| 5,680,305 A | 10/1997 | Apgar |
| 5,732,398 A | 3/1998 | Tagawa |
| 5,948,040 A | 9/1999 | DeLorme et al. |
| 6,023,687 A | 2/2000 | Weatherly et al. |
| 6,049,784 A | 4/2000 | Weatherly et al. |
| 6,088,686 A | 7/2000 | Walker et al. |
| 6,119,101 A | 9/2000 | Peckover |
| 6,169,981 B1 | 1/2001 | Werbos |
| 6,512,525 B1 | 1/2003 | Capps |
| 6,738,753 B1 | 5/2004 | Hogan |
| 7,072,847 B2 | 7/2006 | Ulenas et al. |
| 7,096,193 B1 | 8/2006 | Beaudoin et al. |
| 7,107,239 B2 | 9/2006 | Graff |
| 7,152,037 B2 | 12/2006 | Smith |
| 7,162,494 B2 | 1/2007 | Arellano |
| 7,203,662 B2 | 4/2007 | Das et al. |
| 7,254,559 B2 | 8/2007 | Florance et al. |
| 7,287,008 B1 | 10/2007 | Mahoney et al. |
| 7,302,406 B2 | 11/2007 | Mallo et al. |
| 7,319,976 B1 | 1/2008 | Peckover |
| 7,376,613 B1 | 5/2008 | Cofino et al. |
| 7,386,620 B2 | 6/2008 | Lei et al. |
| 7,464,109 B2 | 12/2008 | Modi |
| 7,533,046 B2 | 5/2009 | Blanz et al. |
| 7,580,855 B2 | 8/2009 | Fernandes |
| 7,613,692 B2 | 11/2009 | Hamilton |
| 7,739,408 B2 | 6/2010 | Fish et al. |
| 7,769,705 B1 | 8/2010 | Leuchtefeld |
| 7,809,601 B2 | 10/2010 | Shaya et al. |
| 7,865,404 B2 | 2/2011 | Peckover |
| 7,904,366 B2 | 3/2011 | Pogust |
| 7,921,068 B2 | 4/2011 | Guyon et al. |
| 7,933,399 B2 | 4/2011 | Knott |
| 7,962,578 B2 | 6/2011 | Makar |
| 7,979,314 B2 | 7/2011 | Ulenas |
| 7,984,005 B2 | 7/2011 | Bridges |
| 8,145,536 B1 | 3/2012 | Goel |
| 8,190,568 B2 | 5/2012 | Caballero-McCann |
| 8,204,790 B1 | 6/2012 | Rogers |
| 8,234,375 B2 | 7/2012 | Ghadialy et al. |
| 8,257,173 B2 | 9/2012 | Bergelt |
| 8,306,874 B2 | 11/2012 | Morgenstern et al. |
| 8,326,890 B2 | 12/2012 | Desbarats |
| 8,346,624 B2 | 1/2013 | Goad et al. |
| 8,364,520 B1 | 1/2013 | Eichorn et al. |
| 8,364,559 B1 | 1/2013 | Bhosle et al. |
| 8,478,660 B2 | 7/2013 | Toro et al. |
| 8,494,936 B2 | 7/2013 | Brenner |
| 8,521,677 B2 | 8/2013 | Spring |
| 8,560,396 B2 | 10/2013 | Peckover |
| 8,589,069 B1 * | 11/2013 | Lehman ............... G01C 21/20 340/995.1 |
| 8,589,529 B2 | 11/2013 | Siegel |
| 8,606,636 B1 | 12/2013 | Keoshkerian |
| 8,660,670 B2 | 2/2014 | Freed |
| 8,666,844 B2 | 3/2014 | Shaya et al. |
| 8,693,751 B2 | 4/2014 | Osborne |
| 8,700,620 B1 | 4/2014 | Lieberman |
| 9,218,392 B1 * | 12/2015 | Zgraggen .......... G06F 17/30867 |
| 2002/0046147 A1 | 8/2002 | Livesay |
| 2002/0107764 A1 | 8/2002 | McCoy |
| 2003/0004859 A1 | 1/2003 | Shaw et al. |
| 2003/0093289 A1 | 5/2003 | Thornley et al. |
| 2003/0144945 A1 | 7/2003 | Opsahl-Ong et al. |
| 2003/0208362 A1 | 11/2003 | Enthoven et al. |
| 2004/0039679 A1 | 2/2004 | Norton |
| 2004/0107173 A1 | 6/2004 | Cheng |
| 2004/0128230 A1 | 7/2004 | Oppenheimer et al. |
| 2005/0055298 A1 | 3/2005 | Czora |
| 2005/0177448 A1 | 8/2005 | Fu et al. |
| 2005/0177488 A1 | 8/2005 | Rexrode |
| 2005/0222861 A1 | 10/2005 | Silverman et al. |
| 2006/0161482 A1 | 7/2006 | Jacobson et al. |
| 2006/0184440 A1 | 8/2006 | Britti et al. |
| 2006/0190279 A1 | 8/2006 | Heflin |
| 2006/0212386 A1 | 9/2006 | Willey et al. |
| 2006/0277077 A1 | 12/2006 | Coleman |
| 2007/0016488 A1 | 1/2007 | Ulenas |
| 2007/0043654 A1 | 2/2007 | Libman |
| 2007/0106563 A1 | 5/2007 | Okada et al. |
| 2007/0106656 A1 | 5/2007 | Gutta |
| 2007/0130059 A1 | 6/2007 | Lee et al. |
| 2007/0162301 A1 | 7/2007 | Sussman |
| 2007/0162332 A1 | 7/2007 | Helm |
| 2008/0040141 A1 | 2/2008 | Torrenegra et al. |
| 2008/0065429 A1 | 3/2008 | Galloway |
| 2008/0120244 A1 | 5/2008 | Mello |
| 2008/0243637 A1 | 10/2008 | Chan |
| 2008/0270163 A1 | 10/2008 | Green |
| 2008/0320040 A1 | 12/2008 | Zhurakhinskaya |
| 2009/0076926 A1 | 3/2009 | Zinberg |
| 2009/0138342 A1 | 5/2009 | Otto |
| 2009/0254360 A1 | 8/2009 | Chouby |
| 2010/0010872 A1 | 1/2010 | Drummond |
| 2010/0121808 A1 | 5/2010 | Kuhn |
| 2011/0015954 A1 | 1/2011 | Ward |
| 2011/0112869 A1 | 5/2011 | Greak |
| 2011/0137776 A1 | 6/2011 | Goad et al. |
| 2011/0212428 A1 | 9/2011 | Baker |
| 2011/0289076 A1 | 11/2011 | Boyle et al. |
| 2011/0307478 A1 | 12/2011 | Pinckney |
| 2011/0320395 A1 | 12/2011 | Dada |
| 2012/0010922 A1 | 1/2012 | Smith |
| 2012/0084129 A1 | 4/2012 | Golden et al. |
| 2012/0143712 A1 | 6/2012 | Echavarria |
| 2012/0158500 A1 | 6/2012 | Hochstatter et al. |
| 2012/0221393 A1 | 8/2012 | Ouimet et al. |
| 2012/0239523 A1 | 9/2012 | Ouimet et al. |
| 2012/0239524 A1 | 9/2012 | Ouimet et al. |
| 2012/0253517 A1 | 10/2012 | Motupalli |
| 2012/0253907 A1 | 10/2012 | Ouimet |
| 2012/0265646 A1 | 10/2012 | Ghadialy et al. |
| 2012/0284138 A1 | 11/2012 | Shave |
| 2012/0330774 A1 | 12/2012 | Sadot et al. |
| 2013/0066697 A1 | 3/2013 | Morganstern et al. |
| 2013/0110947 A1 * | 5/2013 | Boukadakis ............ H04L 67/22 709/206 |
| 2013/0151368 A1 | 6/2013 | Goad et al. |
| 2013/0151369 A1 | 6/2013 | Goad et al. |
| 2013/0173335 A1 | 7/2013 | Evans et al. |
| 2013/0173336 A1 | 7/2013 | Evans et al. |
| 2013/0173418 A1 | 7/2013 | Goad et al. |
| 2013/0231824 A1 | 9/2013 | Wilson |
| 2013/0287270 A1 | 10/2013 | Harper |
| 2013/0316834 A1 | 11/2013 | Vogel |
| 2013/0325652 A1 | 12/2013 | Ouimet |
| 2014/0032467 A1 | 1/2014 | Reddy |
| 2014/0044364 A1 | 2/2014 | Abdulhayoglu et al. |
| 2014/0046891 A1 | 2/2014 | Banas |
| 2014/0074617 A1 | 3/2014 | Mukherji et al. |
| 2014/0075385 A1 * | 3/2014 | Wan ................ G06Q 10/1093 715/812 |
| 2014/0081684 A1 | 3/2014 | Hadar |

(56) References Cited

U.S. PATENT DOCUMENTS

| | | | |
|---|---|---|---|
| 2014/0108189 A1 | 4/2014 | Schumann | |
| 2014/0114705 A1 | 4/2014 | Bashvitz et al. | |
| 2014/0214486 A1 | 7/2014 | Greystoke | |
| 2014/0214615 A1 | 7/2014 | Greystoke | |
| 2015/0012467 A1 | 1/2015 | Greystoke | |
| 2017/0124208 A1* | 5/2017 | Jammalamadaka | G06F 17/30867 |

OTHER PUBLICATIONS

PCT/US2014/046059, Written Opinion, dated Apr. 2, 2015.

Greystoke, Intelligent Property Rental System, U.S. Appl. No. 14/603,227, filed Jan. 22, 2015, 66pages.

Greystoke, Purchasing Feedback System, U.S. Appl. No. 14/640,865, filed Mar. 6, 2015, 63 pages.

Richard Magnone, The Art of Finding the Right Tenant, Jul. 19, 2009.

International Search Report and Written Opinion, PCT/US2014/013948, dated May 15, 2014, 7 pages.

International Search Report and Written Opinion, PCT/US2014/013952, dated May 7, 2014, 7 pages.

Dyshlevoj, English Abstract, RU 2254611, dated Jun. 20, 2005, 2 pages.

Preliminary Report and Written Opinion, PCT/US2014/013948, dated Aug. 13, 2015, 4 pages.

Preliminary Report and Written Opinion, PCT/US2014/013952, dated Aug. 13, 2015, 5 pages.

Le, Building High-level Features Using Large Scale Unsupervised Learning, Proceedings of the 29 th International Conference on Machine Learning, 11 pages, 2012, Edinburgh, Scotland, UK.

Dean, Using Large Scale Brain Simulations for Machine Learning and A.I., Google Blog, Jun. 26, 2012, 7 pages.

Mnih, Playing Atari with Deep Reinforcement Learning, Deep Mind Technologies, pp. 1-9, Dec. 19, 2013.

Tat Y. Chan, Vrinda Kadiyali, and Young-Hoon Park "Willingness to Pay and Competition in Online Auctions", 32 pages, 2006 downloaded on May 9, 2017 from http://apps.olin.wustl.edu/faculty/chan/files/WTP%26Competition.pdf.

* cited by examiner

SYSTEMS AND METHODS OF PROVIDING OUTCOMES BASED ON COLLECTIVE INTELLIGENCE EXPERIENCE

CROSS-REFERENCE TO RELATED APPLICATION(S)

The present application is a continuation-in-part of and claims priority to U.S. patent application Ser. No. 14/327,543, filed on Jul. 9, 2014, and entitled "Computer-Aided Decision Systems," which is a continuation-in-part of and claims priority to U.S. patent application Ser. No. 14/169,058, filed on Jan. 30, 2014, entitled "VIRTUAL PURCHASING ASSISTANT", which claimed priority to U.S. Provisional Patent Application No. 61/759,314, filed on Jan. 31, 2013, and entitled "VIRTUAL PURCHASING ASSISTANT"; and is also a continuation-in-part of and claims priority to U.S. patent application Ser. No. 14/169,060 filed on Jan. 30, 2014, entitled "DUAL PUSH SALES OF TIME SENSITIVE INVENTORY", which claimed priority to U.S. Provisional Patent Application No. 61/759,317, filed on Jan. 31, 2013, and entitled "DUAL PUSH SALES OF TIME SENSITIVE INVENTORY"; and is also a non-provisional of and claims priority to U.S. Provisional Patent Application No. 61/844,355, filed on Jul. 9, 2013, entitled "INVENTORY SEARCHING WITH AN INTELLIGENT RECOMMENDATION ENGINE"; is also a non-provisional of and claims priority to U.S. Provisional Patent Application No. 61/844,353, filed on Jul. 9, 2013, entitled "SINGLE PAGE TRAVEL SEARCH AND RESULTS MODIFICATION"; and is also a non-provisional of and claims priority to U.S. Provisional Patent Application No. 61/844,350, filed on Jul. 9, 2013, entitled "SEARCHING FOR INVENTORY USING AN ARTIFICIAL INTELLIGENCE PRIORITIZATION ENGINE"; and is also a continuation-in-part of and claims priority to U.S. patent application Ser. No. 14/603,227 filed on Jan. 22, 2015, entitled "INTELLIGENT PROPERTY RENTAL SYSTEM"; and is also a continuation-in-part of and claims priority to U.S. patent application Ser. No. 14/640,865 filed on Mar. 6, 2015, entitled "PURCHASING FEEDBACK SYSTEM"; and is also a continuation-in-part of and claims priority to U.S. patent application Ser. No. 14/738,881 filed on Jun. 13, 2015, entitled "SYSTEMS AND METHODS FOR A LEARNING DECISION SYSTEM WITH A GRAPHICAL SEARCH INTERFACE"; and is also a non-provisional of and claims priority to U.S. Provisional Patent Application No. 62/011,574, filed on Jun. 13, 2014, entitled "PERSONA-BASED PURCHASING ASSISTANTS", the contents of all of which are hereby incorporated by reference in their entireties.

FIELD

The present disclosure is related to artificial intelligence based decision systems, and more particularly, the present disclosure is related to computer-aided search systems and methods utilizing artificial intelligence to provide a collective intelligence experience.

BACKGROUND

Computers are complex machines that allow individuals to receive the benefit of significant computational processing power. However, even with sophisticated software, computers often merely perform the functions they are specifically programmed to do. The computer is generally ignorant of the user's needs. For example, when a user performs a search for information via a computer, the quality of search and thus the quality of the search result will be limited by what the search system is programmed to return and may be further limited to the keywords provided by the user.

SUMMARY

The systems and processes described herein can provide continuous, intelligent, personally targeted, real-time decision-making tailored specifically to user preferences, behaviors, locations, or other factors and influenced by the collective experience of multiple users. In certain embodiments, the systems and methods may include a computing system having artificial or augmented intelligence that may be configured to identify what a user may be looking for or want, may help the user determine a better search, and then select and present results for the particular user. In some embodiments, the system can also generate a graphical user interface (GUI) to present search results and optionally supplemental information derived from a plurality of users over time (i.e., collective information).

Embodiments of a collective intelligence experience system and method may include a processor and a memory accessible to the processor. The memory may be configured to store instructions that, when executed, cause the processor to provide one or more recommended searches to an interface based on collective information and in response to input data at the interface. The memory may further store instructions that, when executed, cause the processor to provide a graphical user interface including one or more search results based on at least one of the input data and the one or more recommended searches. In some embodiments, with respect to the one or more recommended searches, the system may provide recommendations, advice, associated data, or any combination thereof.

Embodiments of a collective intelligence experience system, described herein, can implement providing "better" or "best" searches on behalf of a client either at a time that a request or initial search is received, as the user is entering his or her query, or during or after an initial search has been completed. Better searches lead to better results. The "better" or "best" search may be based on a client's query, desired outcome or outcomes, including prioritization of outcomes, previous searches and results and interaction with the same (collective information from a user or multiple users), yield management rules, group search results, other data, or any combination thereof.

In some embodiments, a system may include a processor and a memory accessible to the processor. The memory may include instructions that, when executed, cause the processor to receive data corresponding to an input and determine one or more recommended searches based on collective information in response to receiving the data. The memory may further include instructions that, when executed, may cause the processor to generate an interface including at least one user-selectable element related to the one or more recommended searches and at least one of an associated recommendation and data representing possible outcomes of the one or more recommended searches.

In still other embodiments, a computer readable memory device may include instructions, that, when executed, cause a processor to perform a method including generating an interface including one or more selectable elements accessible by a user to provide a user input. The memory may further include instructions that, when executed, may cause the processor to receive data corresponding to an input, determine one or more recommended searches related to the data and based on collective information other than the input, and provide the one or more recommended searches and associated information to the interface.

BRIEF DESCRIPTION OF THE DRAWINGS

In the following discussion, reference numerals may be reused to indicate the same or similar elements in the various illustrated embodiments.

DETAILED DESCRIPTION

Figure 1:
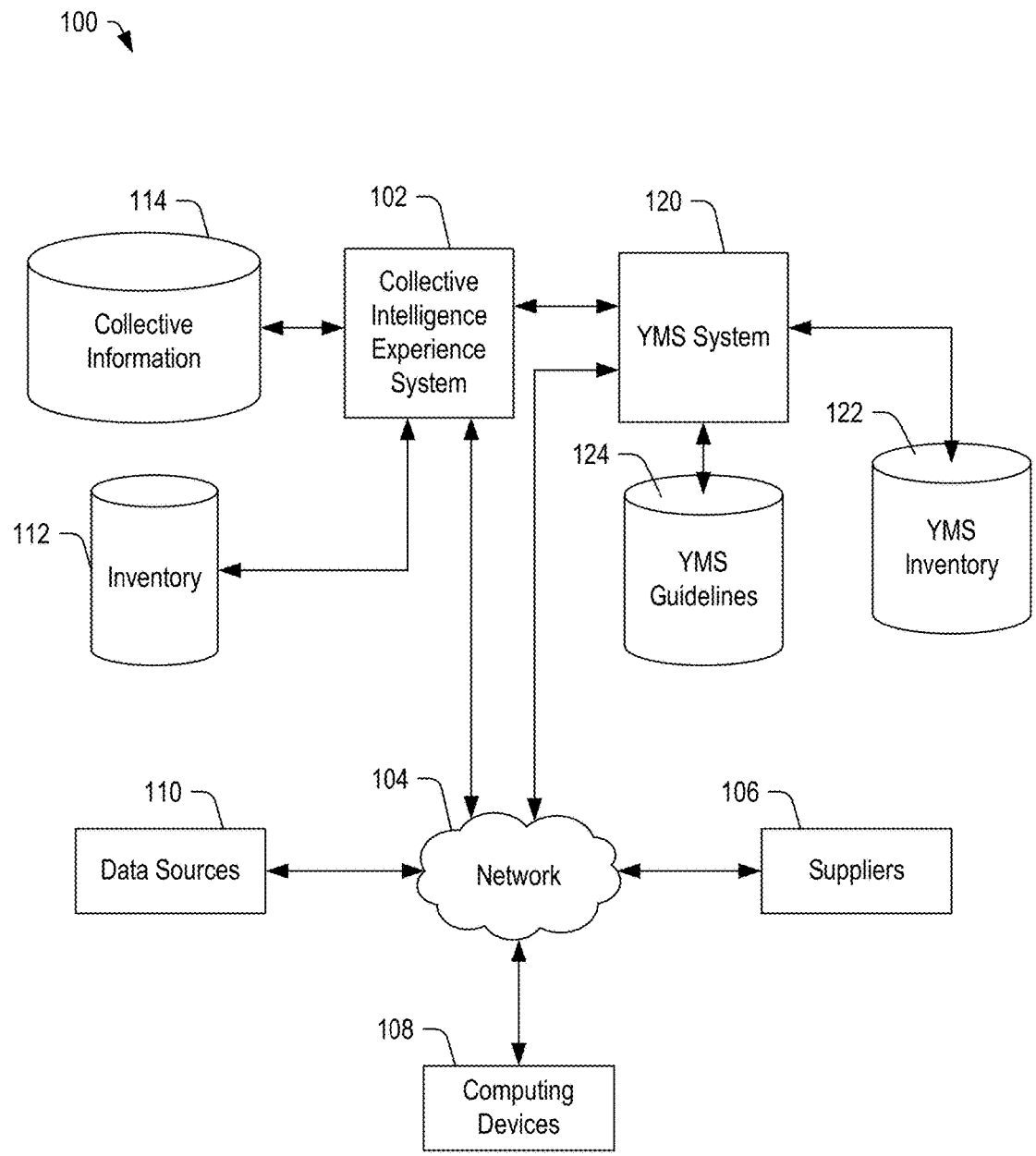
FIG. 1 is a block diagram of a system including a collective intelligence experience system, in accordance with certain embodiments of the present disclosure.

In the following detailed description of the embodiments, reference is made to the accompanying drawings which form a part hereof, and in which are shown by way of examples. The features of the various embodiments and examples described herein may be combined, exchanged, removed, other embodiments utilized, and structural changes made without departing from the scope of the present disclosure.

One or more aspects or features of the subject matter described herein can be implemented in digital electronic circuitry, integrated circuitry, application specific integrated circuits (ASICs), field programmable gate arrays (FPGAs), another dedicated hardware implementation, computer hardware, firmware, software, or any combination thereof. In accordance with various embodiments, the methods and functions described herein may be implemented as one or more software programs executable by a computer processor of a computing device, such as a laptop computer, a server, a desktop computer, or a handheld computing device, such as a tablet computer, a personal digital assistant (PDA), or smart phone. Further, in some embodiments, the methods and functions described herein may be implemented as a device, such as a non-volatile computer readable storage device or memory device, including instructions that, when executed, cause a processor to perform the methods and functions.

Unlike conventional search systems, embodiments of a collective intelligence experience system may be directed to identifying outcomes that may satisfy a particular request. In some embodiments, the system may be configured to identify potential outcomes that may be based on a user's request and optionally to identify potential outcomes related in some way to the user's request that may be based on collective intelligence derived from other users' decisions, other users' searches, information determined by artificial or augmented intelligence, and so on. In some embodiments, the collective intelligence experience system may identify multiple outcomes that the user could conceivably want to achieve, some of which may be more important than others, some of which may be critical to the user, and some of which may not be as important. In some embodiments, the system may be configured to determine the outcome that the user may be trying to achieve as an outcome and can predict what results are most likely to achieve that particular outcome, what flexibility there is in achieving that outcome, what the value of each path to that outcome is relating to any number of potential factors such as price, convenience, comfort etc. allowing an assessment to be made of best true value and best true value to that user at that time.

In some embodiments, a collective intelligence experience system can analyze outcomes and sub-outcomes individually and collectively to identify better options for a particular user. In some embodiments, the system may compare search results from multiple queries to determine which results are better based on the collective information and based on a user's persona. A persona may include a digital representation of an individual consumer, a group of consumers, an organization, one or more other entities, or any combination thereof.

In the following discussion, embodiments of the collective intelligence experience system may be described with respect to travel, providing enhanced, improved or better searches that can provide better outcomes for the user. While the examples of the travel industry may provide good examples of how the systems herein can provide valuable insights and decision-making capabilities, the travel sector may be only one of many different sectors in which the systems and processes herein can be implemented.

FIG. 1 is a block diagram of a system 100 including a collective intelligence experience system 102, in accordance with certain embodiments of the present disclosure. The collective intelligence experience system 102 may be configured to communicate with one or more suppliers 106, one or more computing devices 108, and one or more data sources 110 through a network 104, such as the Internet. Further, the collective intelligence experience system 102 may communicate with an inventory data source 112 and a collective information data source 114. The inventory data source 112 may be automatically collected from various sources, normalized into a pre-defined format, stored, and indexed for retrieval. The collective information data source 114 may be determined over time from interactions by a variety of users and through a plurality of searches, and the collective information data source 114 may be updated continuously or periodically as new information is obtained. Evaluation of retrieved inventory data and collective information may be analyzed to determine better searches, better results, and so on. Such information may be assembled and stored in the collective information data source 114 and used to enhance the response of the system to subsequent requests.

In some embodiments, the computing devices 108 may include laptop computers, tablet computers, servers, personal digital assistants (PDAs), smart phones, another data processing device, or any combination thereof. In some embodiments, one or more of the computing devices 108 may be operated by a user, an administrator, or another type of operator. In some embodiments, one or more of the computing device 108 may execute agents, artificial intelligence engines, or other applications, which may interact with the collective intelligence experience system 102 autonomously.

In some embodiments, the suppliers 106 may include companies, website sellers, and other sources of goods or services with which a user may interact to purchase a product or a service. In the context of travel services, suppliers 106 may include airlines, hotels, ticket resellers, information aggregators, train operation companies, water-based travel services, car rental companies, bus companies, activities, tours, events, and so on.

In some embodiments, data sources 110 may include news services, web sites, blogs, databases, and other sources of information. The data sources 110 may provide news, reviews, and other information, which may be consumed by the collective intelligence experience system 102.

In some embodiments, the collective intelligence experience system 102 may utilize data gathering components, such as a web crawler, an Internet bot (also known as web robot, WWW robot or simply bot, which is a software application that runs automated tasks over the Internet), a plugin, another application, or any combination thereof. The data gathering components may scrape data from various sources, and the collective intelligence experience system 102 may normalize the data by organizing the data into a structured format, which can be indexed, searched, and correlated with other data similarly organized.

The system 100 may further include a yield management system (YMS) 120, which may be coupled to the collective intelligence experience system 102. The YMS system 120 may also be coupled to YMS inventory 122, which may overlap with inventory determined from the various suppliers 106 and which may include other inventory that may include special offers, incentives, private inventory, or other information that may not be available through supplier web sites. In some embodiments, the YMS system 120 may also be coupled to a database of YMS guidelines 124.

The YMS system 120 may include a machine learning module, an artificial intelligence agent, a normalizer and other components, such as those discussed with respect to the collective intelligence experience system 102 in FIG. 4 below. In some embodiments, the YMS system 120 may utilize YMS guidelines 124 to identify potential searches, modifications to a user's query, potential outcomes, and potentially relevant information that may impact a user's decision-making. In some embodiments, the YMS guidelines 124 may include information about where to search, how to search, and the timing of searches that may produce better outcomes for a client, which may be an autonomous device or a user operating a device. The YMS guidelines 124 may be developed over time from various data sources, such as industry publications, news articles, fare comparison data, and so on. The YMS guidelines 124 may also be developed from historical information, industry experts, frequent flyers, and other information. In some embodiments, the YMS guidelines 124 may provide the YMS system 120 with variations, recommended searches, alternatives, and so on, which may be used to identify outcomes that may be better than the results that the client may find. The YMS guidelines 124 may include general rules or guidelines, guidelines for searches when a particular route is involved, guidelines for searching particular times, guidelines for combining various options, and so on. Over time, selected YMS guidelines 124 may be weighted up or down, may be removed, may be limited to particular routes or particular airlines, and so on. In some embodiments, the YMS system 120 may recommend a better or alternative search in response to a query from a client.

In some embodiments, the collective intelligence experience system 102 may receive a request. The request may be for a product, a service, information, or any combination thereof. In response to the query, the collective intelligence experience system 102 may retrieve one or more outcomes from the inventory 112, which may include products, services, or other information. Further, the collective intelligence experience system 102 may communicate the query to the YMS system 120, which may process the query using the YMS guidelines 124 and the YMS inventory 122. The YMS system 120 may communicate one or more outcomes to the collective intelligence experience system 102 for inclusion with other outcomes to be presented to the requestor (client or user).

In many instances, the result or results provided in response to the request may be an "outcome", which may be more than just a simple search result. The system 102 may present a graphical user interface (GUI) including multiple possible outcomes, and a user may interact with the GUI to provide feedback relating to the outcomes, to review selected outcomes, and to select or reject one or more of the outcomes. In some embodiments, in response to receiving the request or as the user types a request into the GUI, the system 102 may access the collective information 114 to determine how the request might be changed to achieve one or more better outcomes, and the system 102 may offer suggestions to the user regarding other possible requests to perform and might even suggest a number of results available if such an alternative request were performed. Additionally, within the GUI, the system 102 may provide a user-selectable element accessible by a user to access outcomes and other information determined from retrieved collective information.

In some embodiments, the collective intelligence experience system 102 may be configured to identify one or more travel options available to a user in response to a user request. The YMS system 120 may suggest additional outcomes. For example, the search may be for a flight from Austin, Tex., to London, England. The YMS system 120 may determine (based on the YMS guidelines 124) that at least a portion of the flight may be purchased for less and at a higher class of ticket for less money if the portion is purchased as two separate one-way tickets, for example Austin to Dallas while the rest of the flight segments for example Dallas to London may be purchased as round trips. Further, in some embodiments, the YMS system 120 may include special offers that may be pushed to the client as part of the results.

In some embodiments, a machine learning component of the YMS system 120 may process trends, analyze YMS inventory 122, review outcomes, and generally operate as an observer. The machine learning component may cause the YMS system 120 to modify one or more of the guidelines of the YMS guidelines 124. In some embodiments, an AI engine of the YMS system 120 may learn from interactions with the YMS inventory 122 and may make adjustments to the YMS guidelines 124 based on other factors, such as political factors (wars, travel advisories, and so on), health factors (contagious viruses, and the like), weather factors (approaching hurricanes, etc.), other factors, or any combination thereof.

The collective intelligence experience system 102 may search the inventory 112 to identify one or more outcomes that may satisfy the request. As previously mentioned, the inventory 112 may include products, services, information, or any combination thereof. Further, the collective intelligence system 102 may search the collective information 114 to determine collective information from other searches performed by other users, outcomes selected by other users or by the current user in the past, and other information. Further, the collective intelligence experience system 102 may recommend additional searches or alternative searches based on information received from the YMS system 120 and may provide one or more outcomes related to searches recommended by the YMS system 120. The collective intelligence experience system 102 may provide a GUI including the one or more outcomes from the inventory 112, based on the query as well as collective information determined from other users, and including one or more outcomes from the YMS system 120. In some embodiments, the GUI may include information related to the collective information or a button or link to access information derived from the collective information. In some embodiments, the collective intelligence experience system 102 may search the inventory 112 using search information determined from the collective information 114.

Figure 2:
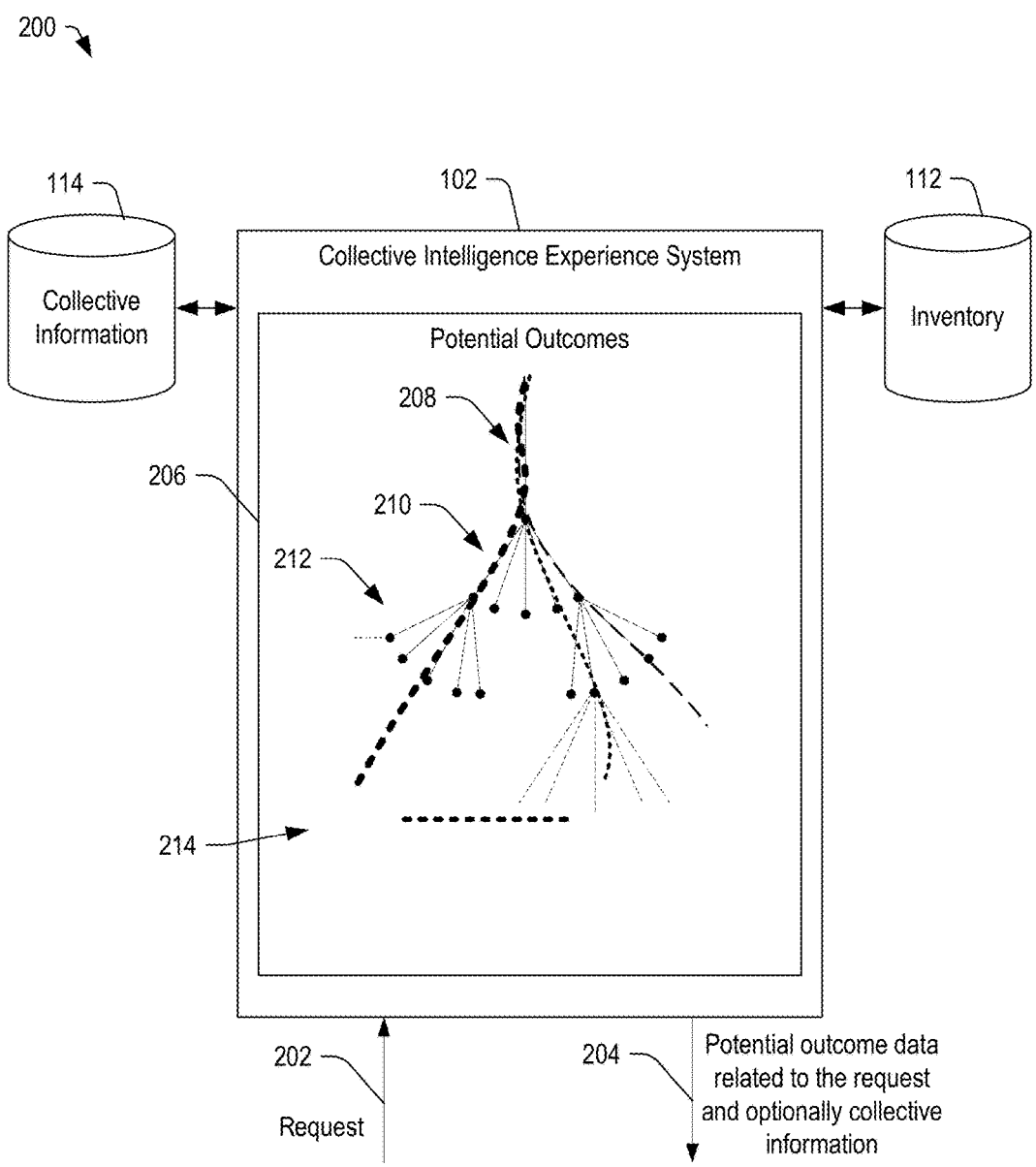
FIG. 2 is a block diagram of a system including the collective intelligence experience system of FIG. 1, in accordance with certain embodiments of the present disclosure.

FIG. 2 is a block diagram of a system 200 including the collective intelligence experience system 102 of FIG. 1, in accordance with certain embodiments of the present disclosure. The collective intelligence experience system 102 may receive a request 202 from a source, such as a computing device 108 via a network 104 (in FIG. 1). The request 202 may include one or more parameters, which might be used for a search. In the context of travel, the one or more parameters may include a destination and a date, for example. The collective intelligence experience system 102 may query the inventory 112 based on the request 202. Further, the collective intelligence experience system 102 may process the request 202 based on the collective information 114 and may retrieve further information from the user 112 based on searches determined from the collective information 114.

The collective intelligence experience system 102 may process the results retrieved from the inventory 112 to determine a plurality of potential outcomes 206. Each of the potential outcomes 206 may be segmented into a plurality of parameters, which parameters may be conceptually linked to form a series of branches. In the illustrated example, the potential outcomes 206 may include a first tier parameter 208, a second tier parameter 210, a third tier parameter 212, and a plurality of additional tiers of parameters 214. In some embodiments, the tiers may represent a hierarchy of relative importance of each of the parameters to a particular user. For example, in some embodiments of a travel system, the collective intelligence experience system 102 may process the parameters of each result into an ordered tree, which may have a first parameter (such as destination) as a first tier parameter 208, duration as a second tier parameter 210, cost as a third tier parameter 212, and so on.

Each potential outcome may be represented by a dashed or dotted line that extends through one or more of the parameter tiers. In an example, the node tree of the parameters of each of the potential outcomes could be organized from the perspective of any of the parameters. Depending on the implementation, the first tier 208 may be cost, destination, departure city, company name, etc. Any parameter that may be used to form the basis of a decision may be used as a node within the tree. The collective intelligence experience system 102 may be configured to generate a GUI including potential outcome data (such as a list of results) and optionally collective information 204, which GUI may be provided to a destination device, such as computing device, via the network 104.

Figure 3:
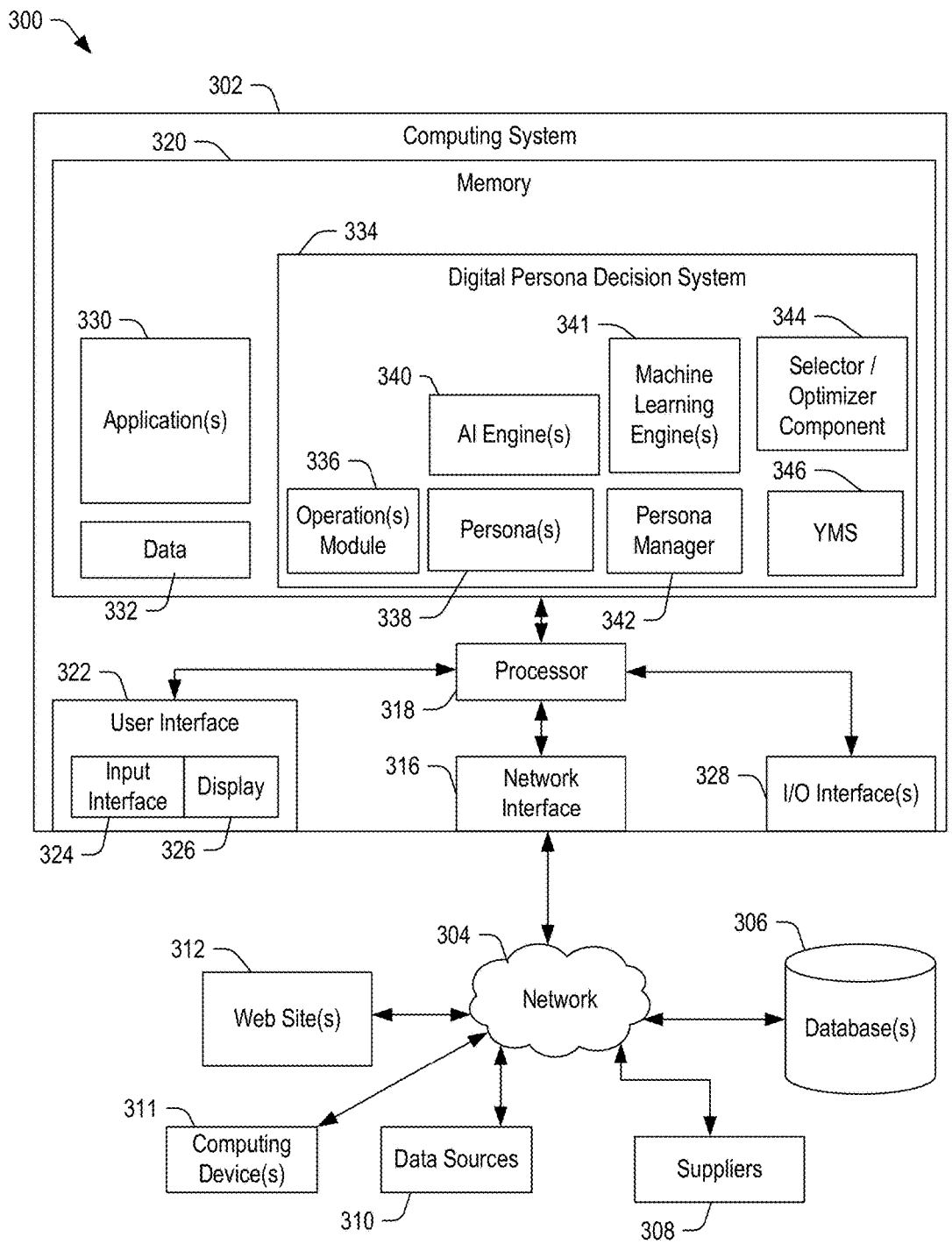
FIG. 3 is a block diagram of a collective intelligence experience system, in accordance with certain embodiments of the present disclosure.

FIG. 3 is a block diagram of a collective intelligence experience system 300, according to certain embodiments. The system 300 can include a computing system 302 that may be configured to communicate through a network 104 with one or more databases 306, one or more suppliers 308, one or more other data sources 310, one or more computing devices 311, one or more web sites 312, other data sources, or any combination thereof.

The computing system 302 may include a network interface 316 configured to communicate with the network 304. The computing system 302 may also include a processor 318 coupled to the network interface 316, to a user interface 322, to a memory 320, and to an input/output (I/O) interface 328. In some embodiments, the user interface 322 may include a display interface configured to couple to a display device and an interface (such as a Universal Serial Bus port) configured to couple to a keyboard, a mouse, or another input device to receive user input. In certain embodiments, the user interface 322 may include the input interface 324 and a display 326, such as a touchscreen.

The memory 320 may include a disc drive, a flash memory, cache memory, Random Access Memory (RAM), Read Only Memory (ROM), any other type of memory devices, or any combination thereof. At least a portion of the memory 320 may include a non-volatile memory configured to store data 332 and to store instructions that may be executed by processor 318 to perform a variety of functions and operations. The memory 320 may store one or more software applications 330 and a digital persona decision system 334. The digital persona decision system 334 may include an operations module 336, personas 338, a persona manager 342, one or more machine learning engines 341, a selector/optimizer component 344, and one or more artificial intelligence (AI) engines 340. The selector/optimizer component 344 can include yield management system 346.

The collective intelligence experience system 300 can be configured to determine "better" or "best" searches to achieve better or best search results for a client after an initial search has been completed, at the point that an initial search is requested, or while the initial search is being entered into an interface (such as a text field of a web page). The "better" or "best" searches may be based on a client's query, desired outcome or outcomes (including outcomes that are inferred as desired), previous search results, yield management rules (which may be determined over time based on which searches may identify the better or best results), group search results, other data, or any combination thereof. Yield management rules may be determined based on information developed over time, such as timing of when prices for flights are increased relative to the departure date, and so on. In some cases, the "better" or "best" searches and correspondingly the better and best results may be determined by artificial intelligence engines 340, a selector/optimizer 344, a yield management system 346, other components, or any combination thereof. In some embodiments, the collective intelligence experience system 300 may be configured to provide an interface including outcomes based on the user's request as well as other potential outcomes based on one or more requests recommended by the system that may have been derived from collective information.

The operations module 336, when executed by the processor 318, may cause the processor to receive data at an input and, after processing with other aspects of the digital persona decision system 334, provide an output including, for example, better searches and corresponding search results or potential outcomes that have been ranked (scored), sorted, weighed individually or together, filtered, or otherwise processed according to a selected one of a plurality of personas 338. The personas 338 may include digital representations of individual consumers, groups of consumers, organizations, other entities, or any combination thereof.

The AI engines 340 can include instructions that, when executed, cause the processor 318 to apply one or more selected personas of the personas 338 to received requests, to results corresponding to the requests, or any combination thereof. The AI engines 340 can cause the processor 318 to process the data according to the selected persona(s) to rank the data, filter the data, or otherwise alter the data to provide a desired result or outcome that corresponds to a particular persona, either based on the request or based on collective information derived from the user, from other users, or any combination thereof. The AI engines 340 may apply the selected persona to try to determine what the user means or is trying to achieve rather than what the user says he or she means (e.g., to retrieve data corresponding to what the user intends to find). The AI engines 340 may also apply the selected persona to rank, sort, filter, or otherwise process received data. In some embodiments, the AI engines 340 may apply the selected persona(s) to negotiate with a supplier on behalf of the user.

Additionally, the AI engines 340 may include at least one evolutionary function that, when executed, causes the AI engines 340 to process and update a persona over time, based on environmental factors, interactions by a user associated with the persona, interactions of other personas, and so on. In particular, the AI engines 340 may rely on experiential learning over time. In certain embodiments, the AI engines 340 can assimilate numerous interactions by various personas, some of which may be similar to the selected persona, to learn experientially. The experiential learning process may involve analyzing persona interactions (explicit or implicit) with the "universe" of available options to generalize trends and other information, which may be used to adjust the selected persona, other personas, etc., and to make recommendations and assist in decision-making. Further, such interactions may be analyzed to enhance the collective information based on requests, outcomes, interactions, or any combination thereof.

In certain embodiments, the AI engines 340 may include collaborative filtering, clustering, classification, frequent pattern mining, outlier detection, noise reduction, and other functionality implemented via distributed or scalable machine-learning algorithms, such as the Apache Mahout machine-learning project or other machine learning systems. Examples of the functionality and algorithms implemented by an Apache Mahout machine-learning system are described, for example, at http://web cs.wpi.edu/~cs525/s13-MYE/lectures/6/HadoopAnalytics.pptx; https://mahout.apache.org/users/recommender/recommender-documentation.html; and https://mahout.apache.org/users/basics/algorithms.html.

In certain embodiments, the AI engines 340 may include collaborative filtering, clustering, classification, frequent pattern mining, outlier detection, noise reduction, and other functionality implemented via systems that may be implemented using declarative rule-based systems, such as Drools or another rule-based management system. The AI engines 340 may be configured to process data (structured, unstructured, or semi-structured data) by filtering, clustering, classifying, weighing, correlating, performing any of the above-described functions, or otherwise processing the data.

The collective intelligence experience system 300 can learn from data based on the user's response to a set of outcomes; based on other actions, searches, and requests by other users; based on other information; or any combination thereof. Further, the collective intelligence experience system 300 can learn from the yield management system rules and the collective information, which may be impacted by other parts of the collective intelligence experience system 300.

The collective intelligence experience system 300 may update or modify the yield management system (YMS) rules via the yield management system 346. YMS rules or yield management system rules may refer to a variable pricing strategy, based on understanding, anticipating and influencing consumer behavior in order to maximize revenue or profits from a fixed, perishable resource (such as airline seats or hotel room reservations or advertising inventory). As a specific, inventory-focused branch of revenue management, yield management involves strategic control of inventory to sell it to the right customer at the right time for the right price. Further, in some instances, the YMS rules may also utilize historical information to identify opportunities for cost savings, to advise customers when to purchase, and to determine better searches and better results. A yield management system 346 can periodically or continuously analyze inventory information, historical data, and other information, and can selectively modify the YMS rules to account for changes over time. The collective intelligence system 300 can utilize the new YMS rules to provide the user with improved, enhanced or better searches and outcomes.

The "best" searches may not be based solely on what a user says he or she wants (i.e. in a request), but may refer to searches that deliver outcomes that may differ from what the user searched for in at least one aspect and that provide a better outcome in terms of cost, timing, or other parameters important to the user (whether the user realizes the importance or not). A concept of "best" or "better" may encompass one or more factors (including a large number of factors), defined by the user, suggested by the system 300, or both. Thus, the "best" searches may provide the user with beneficial outcomes he or she may not have thought of. For example, in the context of travel, the system 300 may present a user with two flight options: option A and option B. Option A and option B may be the same price, but option B may include a stop in New Zealand. While the system 300 may know that the user normally prefers non-stop flights, the system 300 may also know that the user has a friend or business contact in New Zealand he has been wanting to reconnect with, and that New Zealand is a top travel destination in the user's wish list. The system 300 may determine that even though the user typically prefers non-stops, the "best" search results can on this occasion include a stop in New Zealand. In some embodiments, based on further information, such as business schedules, birthdays, social networks interaction, email correspondence or other information, the system 300 may know that on this occasion having a stop in New Zealand may be better for the user.

In another travel example, the system 300 may determine that "best" may not always be the cheapest option, but may instead be an option purchased using a combination of cash and airline miles. For tickets purchased with airline miles, the system 300 can take into account how many mile points (or credits) the user has on different carriers; availability to use the mile points to pay for a particular outcome (e.g. one way/round trip/flexible dates/flexible cities); cost of the ticket using miles on different airlines; taxes and processing fees for the ticket or mileage redemption on different airlines; other factors (e.g., non-upgradeable mileage ticket vs. potentially upgradeable cash ticket); other options; or any combination thereof. Better possibilities may include mileage options from one carrier, options made up of segments from multiple carriers, or a combination of miles and cash on one or more carriers. The attractiveness of these possibilities may change over time as airlines yield management systems regularly reprice cash or mileage tickets based on a number of factors. The system proactively monitors such changes and learns from the collective intelligence and yield management rules when a beneficial change is likely to occur or has occurred.

While the above-examples have largely been directed at travel, in some embodiments, the collective intelligence experience system 300 can provide the "best" searches for identifying non-travel products. For example, a user may want to buy a refrigerator. The collective intelligence experience system 300 may determine a "best" outcome based on product specifications, price, reviews, factory recalls or other parameters, and not solely based on a model number input or brand by the user. Examples of outcomes may include whether a product is new, used, a demo model, refurbished, discontinued, etc. In some cases, the outcomes can include whether the product is being sold as a result of a close out or liquidation. Further, the outcomes can include the product brand's reputation, country of manufacture, warranty terms, installation costs, shipping costs, removal costs, or taxes. In some embodiments, the outcomes can include whether a purchase would take advantage of any holiday promotions, tax-free weekends, seasonal promotions, and so forth. The outcomes may include other parameters not listed.

Finding the "best" outcome may be achieved based on multiple factors including: what users say they want; what they subconsciously want; what their decisions demonstrate they want; what their activities using the system demonstrate they want; what people they trust want and recommend; what experts recommend; other factors; or any combination thereof. The systems and processes described herein may weigh these and other factors (both structured and unstructured) across an entire range of actors and behaviors, and then the systems and processes described herein can prioritize the factors to provide results that are precise and comprehensive and that are aligned with what the user wants.

The process of finding the "best" outcome can include implementing digital personas as described herein. A digital persona can be a digital representation of an entity in accordance with a specific set of rules, preferences, or priorities with respect to a defined situation or opportunity. A digital persona 338 may interact with a universe, which can be a set of conditions and information that an artificial intelligence engine implementing the digital personas can perceive at any given moment. The digital personas can learn, via the artificial intelligence engine, from actions of a user, events in the universe, other personas, a multitude of other factors, or any combination thereof. In some examples discussed, the artificial intelligence engine may include a persona artificial intelligence engine 340 and an evolutionary artificial intelligence engine.

As used herein, a digital persona, such as a persona in the digital personas 338, can be a digital representation of an entity (a human, corporation, group, etc.). A digital persona can be a digital representation of a virtual being or a real being that has a set of preferences or rules in relation to a certain problem. An entity may be a depiction of a virtual or real being that has a set of preferences, weights or tendencies in relation to a certain problem. A potential solution may be a solution to a problem that may or may not relate to the priorities of a corresponding digital persona. In certain embodiments, a potential solution may represent a potential option that may be selected to satisfy one or more of the digital persona's needs or solve their problem. A chosen or selected solution can be at least one of the potential solutions that, by way of weighing, was chosen to be appropriate (or most appropriate) to solve the problem or that was determined, based on scoring, to be the most satisfactory to the digital persona. An engine can be a software mechanism that can process several tasks: such as reads digital persona preferences; obtains a list of potential solutions; combines competing personas into a unified persona; selects between competing personas to identify a subset of possible solutions; and determines optimal solutions with respect to specific situations. Priority can be a way to show a preference in relation to other preferences so as to allow the engine to weigh an impact of a preference on the overall score. An entity may be a human, corporation, or group that may have preferences with respect to a certain problem, a set of products, a scenario, a situation, or any combination thereof. An entity may either be virtual or real. The entity may represent a virtual entity, a person, a certain facet of a person (e.g., the user as a business person vs. the user as a family person), or a surrogate (e.g. an entity acting on behalf of an employer, a parent for a child, a guardian in a custodial relationship, a trustee on behalf of a beneficiary). A parameter may be a specific set of rules, preferences, and priorities established by a user of a digital persona with respect to a defined situation or opportunity to decide among varied options.

A digital persona refers to a snapshot of information captured about a user, by an artificial intelligence of any sort, e.g., machine learning, neural networks, evolutionary/genetic algorithms or other sorts, or a combination of some or all of these, to represent the preference and decision-making process of a represented entity. The digital persona can be used to mimic, replace, supplement or otherwise enhance human or other entity behavior. The digital personas may be the personas 338, and may be included in the digital persona decision system 334.

The systems and methods described herein may utilize personas to provide a personalized experience for a user in almost any commercial sector. The personas can operate to provide a reactive system that reacts to user queries and requests; and a proactive system that anticipates problems, needs, issues, etc. and that may take steps (without user input) to mitigate or solve those problems, needs, and issues, etc. or to coach the user how to do so. The combination of reactive and proactive aspects may provide a dynamic, constantly learning and evolving system that can always operate (e.g. twenty-four hours a day, seven days a week), that does not need to rest, and that can assist the user in a myriad of ways (sometimes without the user being aware). Some examples provided herein reference the travel industry sector, which may be a good example of how the systems herein can provide valuable insights and decision-making capabilities; however, the travel sector may be only one of many different sectors in which the systems and processes herein can be implemented.

The digital persona decision system 334 can include a selector/optimizer component 344 that, when executed, causes the processor 318 to select between available results and to provide selected results to an output. In certain examples, the selector/optimizer component 344 may be presented with multiple sets of search results, which may have been sorted, filtered, ranked, or otherwise processed by the AI engine 340 applying multiple selected personas 338. In an example, the results may be sorted, filtered, ranked, or otherwise processed using one or more selected personas from personas 338 to provide search results ranked across multiple parameters according to each of the selected personas, and the selector/optimizer component 344 may select one of the sets of ranked search results for providing as an output. In certain embodiments, the selector/optimizer component 344 may operate on opportunities, problems, outcomes, and event analysis in response to experiences and activities in the user's life and independent of any user query. In some embodiments, the selector/optimizer component 344 may cause the processor 318 to identify better searches, which may identify better outcomes at the outset. The selector/optimizer component 344 may then cause the processor 318 to select between the better outcomes.

In certain embodiments, the selector/optimizer component 344 may identify better searches based on input data, such as a query, and may select between the sets of search results based on data associated with a requesting device. In some examples, the selector/optimizer component 344 may use the YMS 346 to produce a set of search results. Further, the system 300 may utilize collective information (such as collective information 114 in FIG. 1), which may be determined by the machine learning engines 341, the AI engines 340, the YMS 346, or any combination thereof. The system 300 may utilize the collective information 114 to suggest other searches to the consumer, which other searches may have previously produced "better" or "best" outcomes based on a request. In some embodiments, the system 300 may show results from other searches or from a selection of possible outcomes.

In some embodiments, the selector/optimizer component 344 may process the request to determine searches that may produce "better" or "best" outcomes. For example, a search for a flight from Austin, Tex., to London, England may identify a similar flight from Raleigh, N.C. to London, England in terms of price, but the Raleigh-London flight may be a business class option to which the system may connect the user via a domestic flight. The user may not have thought about searching that particular flight, but the collective intelligence experience system 300 may be able to identify that flight through a better search based on collective intelligence. In some embodiments, the collective intelligence experience system 300 may perform a search that the user would not have thought to do in order to find the user a better option, such as a business class flight for the international segment, which the user may care the most about, while arranging other potential flight segments for economy pricing.

The collective data may include data based on an averaging of outcomes and interactions with such outcomes of multiple users. In some cases, the collective information can include search data and results data from other requests that may or may not be similar to the request submitted by the user. A distribution of requests and search results can be analyzed to determine overall trends of requests and search results and to identify requests, phrases, fields, inputs and techniques that produce better outcomes. In some examples, the collective information may include information about how often users initiate a secondary search, whether users buy products or services after receiving search results, which products or services are bought for business or leisure, what happened to a product price after purchase or other information. In some embodiments, the collective information may include data about where a product was found on attractive terms, particularly (but not exclusively) as compared to products or terms that would have been expected. For example, the collective information may include data about a "great deal" that was unearthed.

In some embodiments, the system 300 may also understand time sensitivity and may be configured to prioritize or potentially to hold a product while compiling a presentation of it (for marketing to one or more users) or while waiting for a decision from a particular user. In some embodiments, the system 300 may book a flight if the flight is cancelable. In some embodiments, the system 300 may book the flight if a "hold" option is not available and if the user has previously been happy for such things to be booked or if the user trusts the system to use its collective wisdom to book a flight that it determines to be a great deal. The inventory handled by the yield management system 346 may periodically or continuously change its YMS rules in response to receiving new data related to products or services, search result trends change, other information is received (updated by experts or as a result of analysis of third party data, such as news, trends, and so on), or any combination thereof. In some cases, the yield management system 346 may update its YMS rules in real time. In some embodiments, the information used to update the YMS rules may be retrieved by a bot application or based on information derived from experts, such as personas corresponding to users determined by the system 300 to be an expert based on prior successful outcomes.

In certain embodiments, the selector/optimizer component 344 may select the "best" outcomes or best searches in response to experiences and activities in the user's life (and in some instances independent of any user query), proactively providing a best representation of the best way to achieve the possible outcomes according to the available information about the user as represented by a persona and according to available inventory (identified using request information from the user, request and search and other data derived from collective information, or both) at that point in time. For example, the selector/optimizer 344 may identify and select the "best" search or results based on a ranking of the user's persona(s) preferences (e.g., non-stop flights are more important than price). In certain embodiments, the computing system 302 may implement a set of digital personas that compete among themselves to resolve a problem or to respond to a request in order to identify one or more outcomes that may best mediate the variable interests of the user of the digital personas. By allowing the multiple digital personas to impact the search and the processing of the results, the computing system 302 may produce multiple, varied search options or outcomes, which can be compared and optionally processed by the selector/optimizer component 344. In certain embodiments, the selector/optimizer component 344 may select between the competing results or may selectively combine results from the competing search options or outcomes. The computing system 302 thereby may identify a plurality of potential options that may be better or best for the particular user.

In some cases, the computing system 302 can produce "better" or "best" searches and outcomes in less time using a system of ontology. Ontology can be a system of standard vocabulary that can be applied to products, services, inventory, events, or other parameters. Examples of standard vocabulary can be airport codes (e.g., ABIA, EWR, DFW, etc.), mattress sizes (e.g., full, queen, king), and so forth. The computing system 302 may determine names and descriptions that can be applied to disparate inventory and event sources. For example, the computing system 302 may determine which cars fall into compact, standard, or luxury classifications by processing data collected from rental car companies. In certain embodiments, the system 302 may normalize received data where the data is inconsistent and may identify the true value of a product where data descriptions are misleading. In a particular illustrative example, the system 302 may be configured to understand that a Ford® Focus® labeled as a sport utility vehicle (SUV) is mislabeled, and determine that the true value of such a vehicle to someone requesting an SUV would be minimal. In some embodiments, the system 300 may also determine how the request may fit into the user's needs at the time. For example, if the user requested an SUV, but the travel involves only the user and his wife, the fact that the user is offered a car that isn't actually an SUV may be acceptable at the right price. If, however, the user has six kids, the non-SUV may not be a suitable option. In general, the collective intelligence experience system 300 may determine a true value of a product and a true value of the product for that user at that point in time seeking that outcome.

In some embodiments, the yield management system 346 may be represented as being included in the selector/optimizer component 344. In other embodiments, the yield management system 344 may be part of the AI engine(s) 340 or combined with other components of the digital persona decision system 334.

Figure 4:
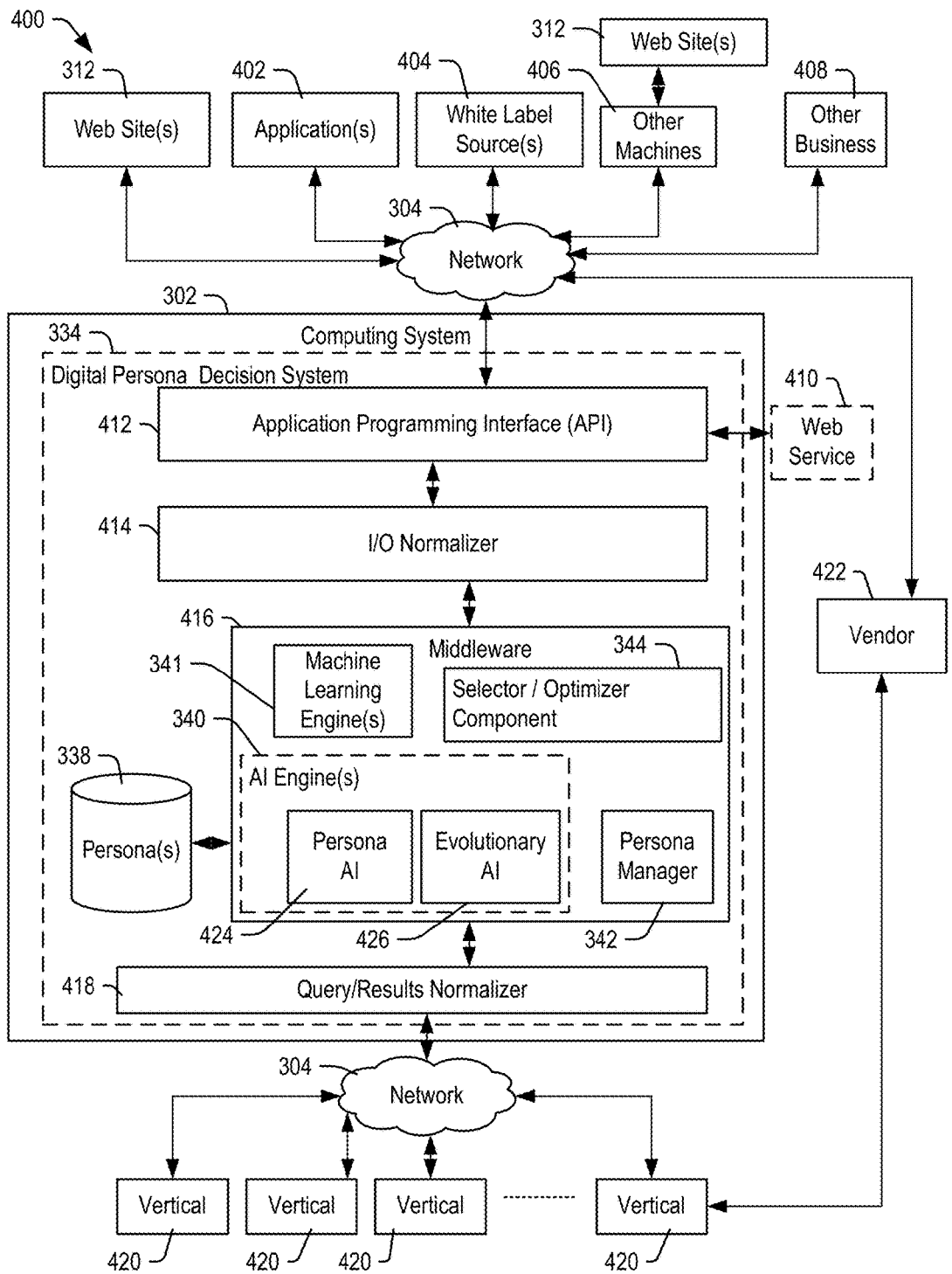
FIG. 4 is a block diagram of a collective intelligence experience system, in accordance with certain embodiments of the present disclosure.

FIG. 4 is a block diagram of a collective intelligence experience system 200, according to certain embodiments. In some embodiments, all of the functions of the computing systems as described with respect to FIGS. 1-3 can be performed by the system 400. The collective intelligence experience system 400 can implement providing "better" or "best" searches on behalf of a client either at a time that a request or initial search is received, as the user is entering his or her query, or during or after an initial search has been completed. Better searches lead to better results. The "better" or "best" search may be based on a client's query, desired outcome or outcomes, including prioritization of outcomes, previous searches and results and interaction with the same (collective information), yield management rules, group search results, other data, or any combination thereof. In some cases, the "better" or "best" search results may be determined by artificial intelligence engines 340, a selector/optimizer 344, a yield management system 346, other components, or any combination thereof.

The computing system 302 may be configured to communicate with web sites 312, applications 402 (including mobile applications), white label sources 404 (i.e., private label applications or services), other machines 406, a web site 312 through one of the other machines 406, other businesses 408, vendors 422, or any combination thereof, through a network 304. Additionally, the computing system 302 may be coupled to one or more verticals 420 through the network 304. The term "vertical" may refer to a particular market sector, such as travel, financial, healthcare, real estate, entertainment, education, military, retail, grocery and produce, employment, etc. Each of the verticals, identified by 420, may include a plurality of websites, businesses, etc. that service that particular sector. Though each of the verticals 420 is depicted as distinct, it should be understood that the verticals 420 overlap one another and that a business entity or website may cross multiple verticals, or sub-categories within one or more verticals (sub-verticals).

The computing system 302 can include the digital persona decision system 334. The digital persona decision system 334 may include an application programming interface (API) 412, which may be coupled to the web sites 312, applications 402, white label sources 404, other machines 406, other businesses 408, web service 410, vendor 422, or any combination thereof. The web service 410 may be part of the computing system 302 or may be associated with another device or system. The API 412 coordinates interactions between the computing system 302 and external components, devices, applications, etc. Further, the API 412 may receive data from the network 304 and may provide the data to an input/output (I/O) normalizer 414.

The I/O normalizer 414 can translate received data into a format suitable for processing by the middleware 416. In certain embodiments, the I/O normalizer 414 may extract, transform, and load (ETL) retrieved data, received queries, and other data using artificial intelligence. In particular, the I/O normalizer 414 may extract data from a received data stream, transform the data into appropriate formats (e.g., transform date information in a form of m/d/yy into a form mm/dd/yyyy), and load the data into a temporary table, which may be provided to the middleware 416. The normalization process may be performed automatically by a machine (the I/O normalizer) and may only utilize a minimal "mapping" effort with respect to placement of the data into the table.

The middleware 416 may include the selector/optimizer component 344, the machine learning engines 341, the AI engines 340, the YMS 346, and the persona manager 342. The persona manager 342 may receive data from the I/O normalizer 414 and determine one or more personas from the personas 338 for use in connection with the received data. Additionally, the persona manager 342 may cause the processor to selectively execute a persona AI engine 424 (which applies selected personas to data), an evolutionary AI engine 426 (which may initiate changes in selected personas based on client interactions with the data, based on information derived from other personas, based on information derived from the "universe" of options, or any combination thereof), or a hybrid of both. The computing system 302 may further include a query/results normalizer 418, which may normalize a query, data, other information, or any combination thereof into data formatted for a particular one of the verticals 420.

In certain embodiments, a client may initiate a query via the web site 312, a mobile application, a business-to-business (B2B) connection, or any other front end device or system, and the query may be submitted to the computing system 302. The client may be a computing device operated by a user or operating autonomously, such as by operation of an artificial intelligence agent. In some embodiments, as the user inputs the query into a field of the web site 312, the API 412 may access collective information to determine if other terms or queries might achieve better outcomes corresponding to the user's query. In some embodiments, the API 412 may suggest one or more changes to the query before the query is submitted in order to improve the retrieved outcomes. Better searches by the system can produce better outcomes. In some embodiments, the better searches may be identified and performed while the search is being performed or even after the results have been provided.

In some embodiments, the API 412 can receive the query and may provide the query to the I/O normalizer 414. The I/O normalizer 414 can process the query into a suitable format for the middleware 416. The API 412 or the normalizer 414 may process the query to determine a vertical that corresponds to the query. One or both of the API 412 and the normalizer 414 may include a plurality of instruction sets. Each instruction set can be selectable to "wrapper" the query and to apply the query to the vertical. The wrapper may both format the query for a particular supplier and direct the system 302 to conduct the search via a particular supplier (i.e. where to send the data, how to send the data, etc.). In some embodiments, one or both of the API 412 and the normalizer 414 may utilize collective information to identify "better" or "best" searches, which may yield better outcomes.

The middleware 416 may select one or more personas from personas 338 using the persona manager 342. The middleware 416 may also apply the selected persona(s) to the query using the persona AI engine 424 to perform query expansion, apply modifications or corrections to the query, and add constraints and refinements to the queries according to a selected persona to customize the query to the selected persona. The middleware 416 may provide the processed query to the query/results normalizer 418, which may format the processed query for a particular vertical 420. The query/results normalizer 418 may then provide the wrapped query to one or more data sources associated with the vertical 420.

In response to the processed and normalized query, the computing system 302 may receive results associated with one or more products in the particular vertical. The query/results normalizer 418 may receive results from multiple data sources and may extract, transform, and load the results into one or more temporary tables, which may be passed to the middleware 416. The persona AI engine 424 may apply one or more selected personas from personas 338 to the results to produce one or more processed results. The processed results may be ranked, sorted, weighed, filtered, processed, or any combination thereof according to each of the one or more selected personas, potentially producing multiple multi-dimensional sets of processed results, which may be provided to the selector/optimizer component 344. The selector/optimizer component 344 may use the YMS 346 to produce a "better" or "best" representation of results. The selector/optimizer 344 can provide the "better" or "best" results to the I/O normalizer 414, which may extract, transform, and load the data from the selected one of the sets of processed results into a format suitable for the API 412 to provide the results to a destination, which may be a device, an application, a web interface, etc.

By applying collective information to a received query, a better or best search may be constructed, which may produce better outcomes. Better searches produce better results. In some embodiments, the API 412 may provide the results of the received query as well as an option to review results from one or more other queries determined from the collective information.

In some embodiments, the I/O normalizer 414 may normalize the input and provide the input to the middleware 416. The middleware 416 can deliver specific facts and circumstances at hand to a persona AI engine 424 with selected digital personas from the personas 338, where each of these selected digital personas offers a potential solution in accordance with the following process: (1) the computing system 302 can produce a solution aligned with specific preferences and restrictions pre-established by the client within each digital persona; (2) the system 300 can conduct a competition among the digital personas to determine optimal solutions for the client in the context of the specific facts and circumstances of each client request; and (3) the system 300 can resolve the problem presented by the client of the digital persona. The selected digital personas may be applied to the persona AI engine 424 to customize the persona AI engine 424, which customized AI may process the input data to adjust keywords, apply restrictions and query enhancements, and produce queries that are aligned with the specific preferences and restrictions associated with that particular persona. Such preferences and restrictions may be configured by a client, may be learned over time from explicit and implicit feedback from the client's interactions, may be inferred from interactions of various personas, or any combination thereof. The queries produced by the persona AI engine 424 based on each of the selected personas may be normalized by query/result normalizer 418 and may be sent to one or more data sources. The system 300 may receive results corresponding to each of the normalized queries, and the results from each of the queries provides a basis for competition among the digital personas, which competition may be resolved by the selector/optimizer component 344 to determine optimal solutions for the particular problem. The results may be normalized by query/result normalizer 418 and provided (together with the associated persona) to the selector/optimizer component 344, which may select between the results or which may selectively combine the results from one or more of the sets of results to produce a set of search results.

In some embodiments, using the collective information, the API 412 and the I/O normalizer 414 may cooperate to analyze the received query against collective information to identify better terms or other better searches that can produce better outcomes corresponding to the request. In an example, the API 412 and the I/O normalizer 414 may produce a "better" search and may present the results of the better search as a selectable option within the web page so that the user may review his/her search results or review results from a "recommended search."

In some cases, the search may be configured based on collective information to produce outcomes that may be more valuable to the consumer than other options. In some embodiments, where rules apply, the system 302 may check two one way travel options or may check a travel option having a stay over with a Saturday night stay or leaving on a Tuesday rather than a Thursday. The system 302 may develop experience with yield management rules as well as routine price variations over time (based on real world sense checking, adding search variations, etc.), and may determine that such variations can provide better results based on the yield management rules.

In certain embodiments, the computing system 302 may recognize a particular persona as being an "expert" based on "successes", where "success" may be defined based on a "purchase" or some other factor. Such experts may be recognized within the computing system 302 based on such information, whether or not that person may be recognized as an expert elsewhere or in any other context. In some embodiments, an expert may be determined based on a user consistently finding low prices, preferred routes, etc. In certain embodiments, the persona may be a "celebrity" or "expert" persona, such as an Einstein persona, which could be an expert persona with respect to certain subject area. Further, the computing system 302 may recognize a "trendsetter" based on the client's ability to make choices, over time, that may be unpopular at the time the choice is made, but that becomes popular shortly after the trendsetter's decision was made. That persona, over time, may be identified as a trendsetter.

Throughout the process, the computing system 302 can intelligently track, collate, analyze, and record each solution, monitor client feedback (explicit and implicit), and thereby continuously learn the habits and behaviors of the client of the digital personas. The learned habits and behaviors may be used by the evolutionary AI engine 426 to refine the digital persona over time to achieve ever-more-effective results.

In certain embodiments, the systems described herein may provide group intelligence by combining clients' experiences, choices and results (through groups of personas) to apply new collective information to future searches. The collective information may be applied at the time the search terms are entered, after the search terms are submitted, while the outcomes are being processed for presentation to the destination device, after the interface including the outcomes is transmitted to the destination device, or any combination thereof.

Figure 5:
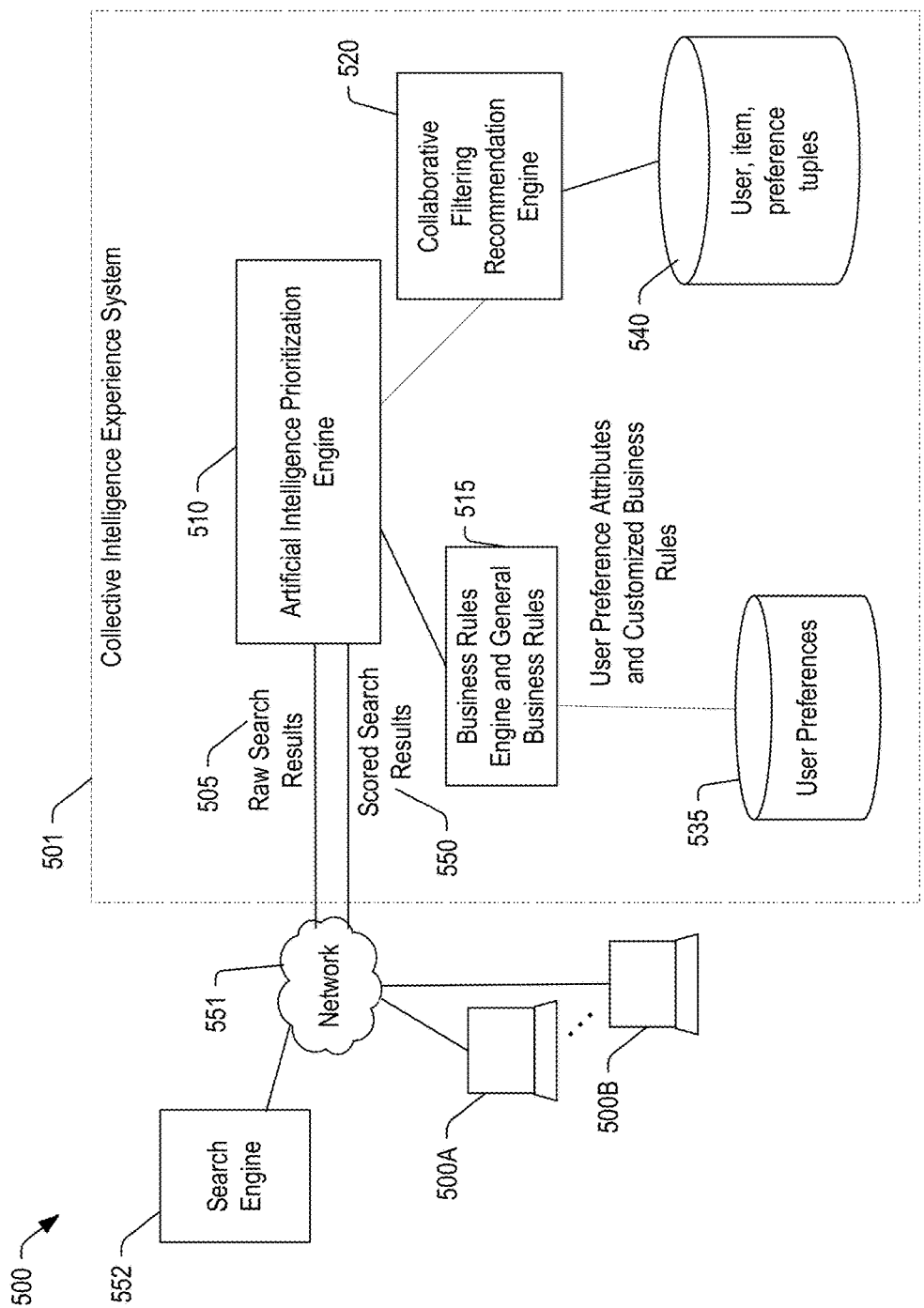
FIG. 5 is a block diagram of a collective intelligence experience system, in accordance with certain embodiments of the present disclosure.

FIG. 5 is a block diagram of a collective intelligence experience system 500, according to certain embodiments. In some embodiments, the system 500 can be an example of the systems of FIGS. 1-4, either of which can perform the functions and features as described herein. The collective intelligence experience system 300 can provide "better" or "best" searches (and thereby better outcomes) to a destination device in response to a request. The better searches can be performed in response to a query or request from the user, proactively by the system 500, or after being requested to do so. Additionally, the better query can be offered at the time of the initial search. In a particular example, if the user searches using a query "x", the best results of the search may be "Y". However, the system 500 may suggest searching "a" and "b" instead of "x", and the system 500 would yield results "C" and "D", which may be better results than "Y" in terms of value to the user. In some embodiments, the results "C" and "D" may be better than "Y", even if they would potentially be very different or would result from a very different search, depending on the intended outcome. The "better" or "best" search may be based on a client's query, based on collective intelligence, derived based on a desired outcome or outcomes, based on previous search results, informed by yield management rules, other data, or any combination thereof. In some cases, the "better" or "best" search may be determined by an artificial intelligence prioritization engine 510, a yield management system 512, other components, or any combination thereof.

The system 500 may include a collective intelligence experience system 501, which may include one or more of the elements of the systems described above with respect to FIGS. 1-4. The collective intelligence experience system may include an artificial intelligence prioritization engine 510, a business rules engine with general business rules 515, a database of client preferences 535, a collaborative filtering recommendation engine 520, and a database with information including client, item, and preference tuples 540 (e.g. ordered lists of elements). In some embodiments, the database 540 may also include collective information, which may be derived from analysis of prior searches and successful outcomes. The collective intelligence experience system 501 may couple to a network 551, a search engine 552, and one or more client interfaces 500A and 500B at computing devices including, for example, desktop computers, laptop computers, tablet computers, smart phones, and the like.

The client interfaces 500A and 500B may include a browser, an application, and the like to allow interaction with system 500. The client interface 500A and 500B may render a graphical user interface (GUI), receive inputs corresponding to the GUI, submit data related to the inputs to the system 501, receive data from the system 501, and present the outcomes. For example, the client interface 500A may accept input from a client to initiate a search for perishable goods or services. A perishable good or service may refer to a product offering that has a shelf-life or expiration. One possible example of such a perishable good or service is a scheduled flight, which expires at the scheduled departure time. The input can be transmitted through network 551 from one of the client interfaces 500A and 500B (e.g., 500A) to the search engine 552, directly, or may be sent indirectly via the collective intelligence experience system 501. In some embodiments, the search engine 552 may be part of the collective intelligence experience system 501.

In some embodiments, while the user is typing in his/her query into a search interface (such as a web page), the collective intelligence experience system 501 may recommend variations to his/her query terms or may recommend alternative "better" searches. In some examples, such recommendations may be presented in a recommendations panel within the interface, within one or more popup windows, or in a list. In some embodiments, the user may submit his/her query and, in response to the query, the collective intelligence experience system 501 may determine one or more "better" searches. The collective intelligence experience system 501 may communicate the "better" searches to the client interface 500A, or may submit the user's query and the "better" searches to the search engine 552.

In response to the user's query and optionally the better searches, the search engine 552 can generate so-called "raw" search results 505, which may not have been processed for prioritization by the collective intelligence experience system 501. The "raw" search results 505 may be ranked or ordered according to search result processing rules of the search engine 552, which may or may not be prioritized according to personas. Accordingly, such raw search results may be further processed by the artificial intelligence prioritization engine 510 using personas.

Depending on the information or metadata that the artificial intelligence prioritization engine 510 has (regarding the search and particular parameters that the client wishes to use during this particular search), the artificial intelligence prioritization engine 510 can draw information from any of the business rules engine and general business rules 515, the database of user (client) preferences 535, the collaborative filtering recommendation engine 520, and the database with user (client), item, preference tuples 540 (e.g. ordered lists of elements). For example, the client can have multiple personas in system 500 with different preferences associated with each persona. Each persona can contain information the client has provided, as well as data collected by the system 500 from past interactions with the client. A client may be associated with multiple personas, and each persona may represent the client in a different context, for example, the client as business traveler, the client as leisure traveler (for example, for trips away with the client's spouse or friends), the client as a group scheduler or travel agent, and the client as a family traveler (for example, for trips with the spouse and kids). In addition, the multiple personas may include sub-personas, which may, for example, differentiate the client's decision-making with respect to a trip with the client's spouse from the client's decision-making with respect to a trip with friends. The personas can be created by the client, automatically generated by or suggested by the collective intelligence experience system 501 based on client activity, manually generated by an operator, or any combination thereof.

Each persona may correspond to different client decision-making contexts. For example, when flying on business, price may not be as important an issue as arrival times and flight duration. For example, the client may be very sensitive to timing issues with respect to routes, stops, and duration to accommodate long or multiple meetings in to a short period of time. When flying as a leisure traveler, price may be a much bigger factor. For some travelers or in some contexts (such as for the purchase of an anniversary vacation), the client may want as much comfort as possible (e.g., first class tickets, which would be more expensive but more comfortable). The client may also have different priorities if traveling with children, where for example being on the fewest number of planes for the shortest period of time may be desirable, even if this costs more money. In some embodiments, a situation may include a situation for a traveler where a preferred or long layover time between flight legs may be desired to accommodate a special needs traveler getting between gates. The collective intelligence experience system 501 can also utilize other information about the client, whether or not such information is communicated as a preference, including the number of children the client has and their ages.

The information including personas and the associated preferences can be stored on the client, item, preference tuples database 540 (e.g. a database of ordered lists of elements). The collaborative filtering recommendation engine 520 can take the search results received from the artificial intelligence prioritization engine 510 and can request additional information corresponding to the indicated persona from the client, item, and preference tuples database 540. The retrieved information can be returned to the collaborative filtering recommendation engine 520 to select search results from the raw search results 505 that reflect the information collected from past interactions with the client from all of the personas, the particular persona being used in this search, or both.

General client preferences, those which may apply regardless of the persona and which are received directly via client input, may be stored in the client preferences database 535. The business rules engine and general business rules 515 can receive information from the artificial intelligence prioritization engine 510 and can return a list of search results to the artificial intelligence prioritization engine 510 based upon the client preferences (the client's persona) in the client preferences database 535.

The artificial intelligence prioritization engine 510 may be configured to apply collective information to a request in order to identify a better search, better search terms, other information, or any combination thereof. Further, the artificial intelligence prioritization engine 510 may be configured to examine the results returned from one or both of the business rules engine and general business rules 515 and collaborative filtering recommendation engine 520, the results from the search engine from one or more queries (i.e., the user's query, a query generated based on collective information, and so on) to compile a refined list of suggested search results that should appeal to the client. The artificial intelligence prioritization engine 310 may use a rule-based engine or other artificial intelligence mechanisms, such as genetic algorithms that mimic the process of natural selection of search problems, evolutionary algorithms, and the like, that can test and evaluate search requests and results. For example, the artificial intelligence engine 510 can use the yield management system 346 to produce the list of search results most likely to be suitable for the client. The yield management system 346 rules may be based on individual or group search results. In some embodiments, the yield management system 346 rules may be based on the business rules 515, the client preferences 535, client persona, search parameters, other data, or any combination thereof. Further, the yield management system 346 may be based on recommendations from the collaborative filtering recommendation engine 520. In some embodiments, the collaborative filtering recommendation engine 520 may produce group search results based search result trends and search results from other personas or may produce searches that may produce "better" search results. The artificial intelligence prioritization engine 510 can provide the search most likely to be suitable for the client. The artificial intelligence prioritization engine 510 may use mechanisms to identify such client archetypes while the client interacts with the system 500. Additionally, the artificial intelligence prioritization engine 510 can determine better searches that lead to better results based on collective intelligence determined from interactions with other clients that perform similar or non-similar searches. The system 500 can utilize artificial intelligence technologies including evolutionary algorithms, genetic algorithms, and the like.

Though the databases 535 and 540 are shown separate from the business rules engine 515 and collaborative filtering recommendation engine 520, the databases 535 and 540 can be located on a computing device, such as a computer server, with one or more of the engines 515 and 520. In some embodiments, the databases 535 and 540 can be located on separate devices communicatively coupled by a network 351. Alternatively or additionally, some of the databases can be located on the same device as the one or more engine(s) while some of the databases or engines can be remotely located.

Figure 6:
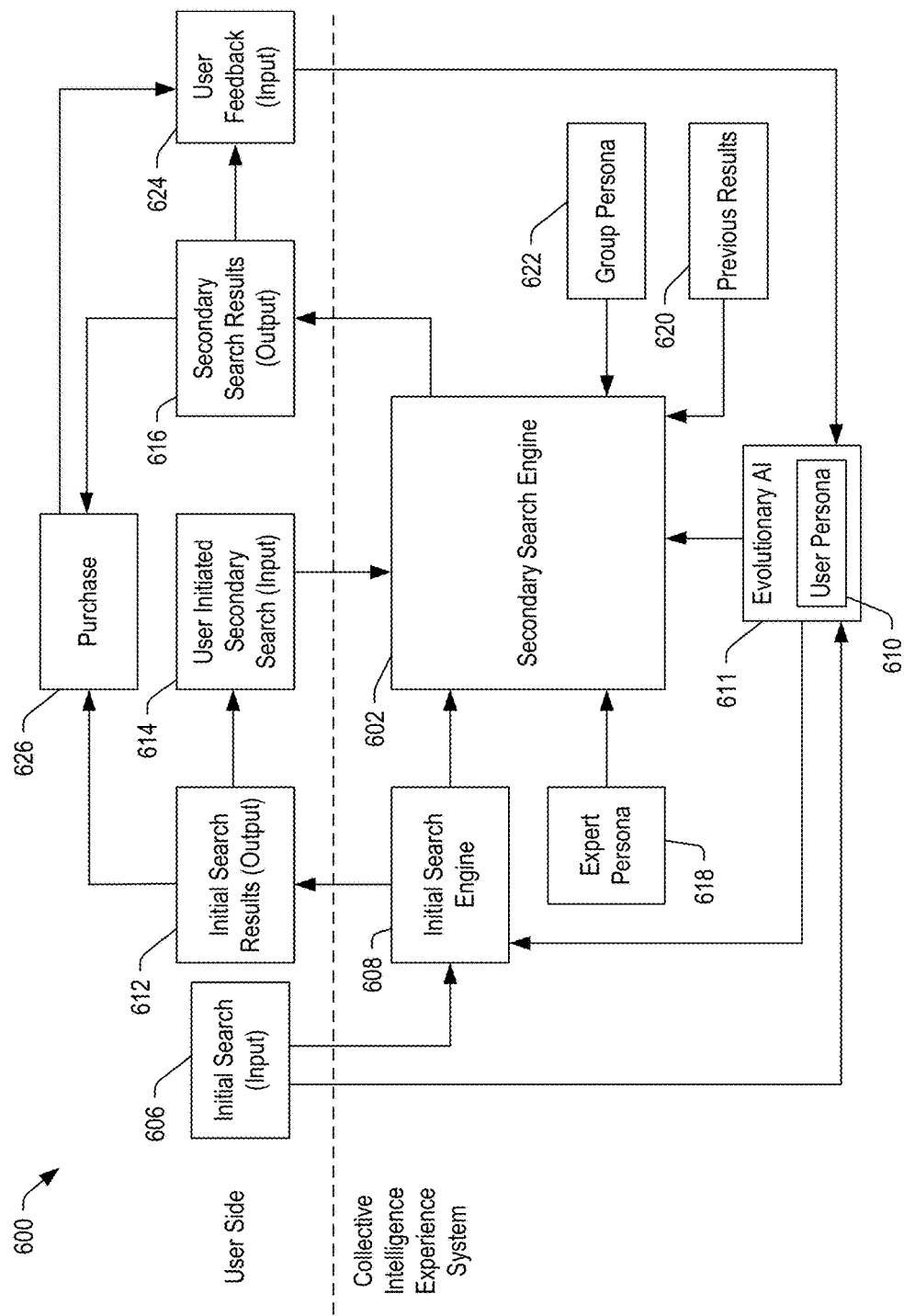
FIG. 6 is a functional block diagram of a collective intelligence experience system, in accordance with certain embodiments of the present disclosure.

FIG. 6 is a functional block diagram of a collective intelligence experience system 600, including a user interface side (labeled "user interface") and including a collective intelligence experience system side (labeled "collective intelligence experience system") according to certain embodiments. The collective intelligence experience system side 600 represents functions and processes that can be implemented by the systems described above with respect to embodiments of FIGS. 1-5. The collective intelligence experience system 600 can be configured to determine a "better" or a "best" search (or query) or to determine "better" or "best" results to a client while the user is typing the initial search, upon submission of the query terms, during the initial search, after the initial search has been completed, or at any time. The "better" or "best" search or search results may be based on a client's query, desired outcome or outcomes, previous search results, yield management rules, group search results, other data, or any combination thereof. In some cases, this may be performed by a secondary search engine 602, a yield management system 604, other components, or any combination thereof.

In some embodiments, the collective intelligence experience system side of the system 600 may perform continuous searches against multiple client searches versus potentially better searches, since the "better" searches and the "better" results may change over time. The time and impact of time may effect group search results and yield management rules. In an example, at certain times of day, a rule may be relaxed or suspended.

A client can enter an initial search (a desired outcome request), at 606, via a client interface. The collective intelligence experience system may provide data including recommend "better" search terms, better searches, or both to the client interface. The client may interact with the "better" searches or search terms to select one or more recommended searches. The desired outcome request may be provided to an initial search engine 608, a previous results repository 620, an evolutionary artificial intelligence ("AI") engine 611 including a user persona 610, or any combination thereof. The initial search engine 608 may generate initial search results based on the desired outcome request (and optionally based on one or more "better" searches) and information determined based on the user persona 610.

The evolutionary AI engine 611 may include at least one evolutionary function that, when executed, causes the AI engine 611 to process and update a persona over time based on various factors, such as interactions of other personas, previous results, user inputs, and so on. In particular, the AI engines 340 may implement an experiential learning process over time, which learning process may cause selected personas to evolve to match changes in the client's behavior and decision-making. In certain embodiments, the AI engines 340 may assimilate numerous interactions by various personas, some of which may be similar to the selected persona, to learn experientially. An experiential learning process may involve analyzing persona interactions (explicit or implicit) with the "universe" of available options to generalize trends and other information, which may be used to adjust the selected persona, other personas, etc., and to make recommendations and assist in decision-making.

The initial search results can be sent to a client, at 612. If a "better" search is available at the time the client conducts a search, the system 600 may notify the client of the "better" search option and may provide an explanation as to why the "better" search option is in fact "better", including ways that the search option is better and possible an explanation of the weakness of the "better" search option. In some cases, the "better" or "best" search option may be based on group search results. For example, the "better" search option may be based on search result trends or group search results (e.g., an increase in flight prices, an unexpected fare sale by a certain airline from a certain market, cheaper rental car prices, etc.). For example, the system 600 may determine that, based on increased flight prices and cheaper rental car prices observed in group search results, the "better" search result may be to fly to an airport several hundred miles away from the preferred destination and then drive a rental car to the destination.

When the client is satisfied with the initial results, he or she may purchase the goods or service, at 626, or may instruct the system to make the purchase. A secondary search may be performed by the secondary search engine 602, at 614. In some embodiments, the user may interact with a user-selectable element to initiate the "better" search. In some embodiments, the collective intelligence experience system side may perform further searches to identify "better" options, whether the client is satisfied with the initial results or not. At the time that the search is entered, the collective intelligence experience system may suggest "better" searches and possibly provide information about the results or outcomes the client might achieve if the "better" search is selected. Alternatively, the client may wait until he/she is dissatisfied with the initial search and then request to see the "better" search and corresponding results. In some embodiments, the client may configure the collective intelligence experience system to perform continuous searches for all of the above or for some subset, such as the original query and one or more selected "better" search options. In some embodiments, the collective intelligence experience system may also suggest how the client may improve his/her query.

In some embodiments, the secondary search engine 602 may be configured to run automatically after a desired output request is received, at 606. In some examples, the secondary search engine 602 may perform a continuous search based on the initial search results, based on the "better" search, based on the initial search, based on user-configured parameters, and so on. In some embodiments, the search result may be sent to the user when the continuous search produces a result that falls within a user specified range (desired outcome). For example, a desired outcome request can include instructions for the collective intelligence experience system to provide a search result to the user when at least one of the following are true: travel time is below a threshold level; price is below a threshold level; mode of travel is acceptable; a combination of these or when other user selectable parameters are acceptable. In some cases, the search result may be sent to the user when the search results fall into a range of values that have been historically accepted by the client. In some embodiments, the system 600 can present the better result to the client automatically, or at the client's request, as a secondary search result. In some embodiments, the collective intelligence experience system may be configured to book a particular travel option automatically, if instructed to do so by the client. In some embodiments, the collective intelligence experience system may hold particular travel options proactively and may alert the client of the held option. Other options are also possible.

The secondary search engine 602 may determine the secondary search results based on the initial search results, expert persona data 618, the user persona 610, data in the previous results repository, group persona data 622, YMS 604 rules, other data, or any combination thereof. In some embodiments, the secondary search engine 602 may apply different weighting factors to the initial search results, expert persona data 618, the user persona 610, group persona data 622, YMS 604 rules, or other data. The weighting factors may be different for each persona, and may be based on the persona's previous search results, desired outcome or outcomes, other parameters, or any combination thereof.

The YMS 604 can include rules based on the group persona data 622, the user persona 610, the expert persona 618, the previous results repository 620, data irregularities, outlier behavior, or other data. In some cases, the rules may be changed based on changes in the previously mentioned data. For example, a rule may state that airline tickets are always cheaper when a Saturday night stay is included; however, if better deals are found that do not include a Saturday night stay, the rule may be changed or it may be adapted for certain routes or for certain times or for any combination of circumstances where either the rule does not apply or an adaptation of the rule applies. The YMS 604 may be used by the secondary search engine 602 to determine secondary search results that are better than the initial search results rules.

The secondary search results may be provided to the client, at 616. The secondary search results may include an explanation as to why the system 600 believes the secondary results are better than the initial results. The collective intelligence experience system may be able to discern the options that are better or worse and may be configured to provide an explanation of why the particular option (search, search term, result, outcome, etc.) is better than others or worse than others. The determination of better may be based on collective information, such as which options are selected more often by other users (social voting), based on price comparisons, based on duration comparisons, based on the reputation of the supplier, based on reviewer information, and so on. In some embodiments, the explanation may be provided in a popup window, in a panel next to the suggested search, or in another position within the client interface. Once the client receives the secondary results, the client may have an option to purchase the good(s) or service(s) provided in the secondary search results. In some embodiments, the client may have instructed the collective intelligence experience system to automatically purchase the option or to hold the option for the client to review prior to purchasing. If a purchase is made, recordation may be made of the purchase and incorporated in user persona 610. In some embodiments, the recordation may be provided to the previous results repository 620, which may store a history of all or a portion of the previous results.

If the client does not purchase the good(s) or service(s) provided in the search results, they can provide feedback. The feedback may include whether or not they liked the provided search results. If the client disliked the search results, the client may be able to say why they disliked them. Further, the client may have an option to rank or prioritize the query terms, the recommended search, the search results or any combination thereof. In some embodiments, the feedback may include search terms, searches, search results, or any combination thereof from other search engines. For example, if the client found a "better" result using a different search or another search engine or website, the search terms, the search, the source, and the result may be analyzed for future searches.

In some embodiments, the feedback may include a client's selection of micro-services. Micro-services may be searches or features available to a client. Some examples of micro-services can be a secondary search, a continuous search, an automatic search result notification, automatic purchasing, and so forth. In some cases, the micro-services may be provided to a customer for a fee. The fee may be a one-time fee, a per use fee, a subscription fee, a per user fee, or another fee. The micro-services may be provided individually or in groups. For example, a client may have the option to pay for a secondary search, at 614, after receiving the initial search results 612. In some embodiments, the secondary search may be tier based. For example, for a fee, the secondary search engine 602 may be based on the expert persona data 618 and the group persona data 622. For a larger fee, the secondary search may be based on the expert persona data 618, the group persona data 622, and the YMS 604. Other examples of micro-services can include a search recommendation function, a human readable explanation and justification function (e.g. the system will explain differences between a secondary search and an initial search), a reinforcement learning function (the system may favor high utility choices learned from direct customer feedback and observed feedback), classification function (i.e. the system can learn to recognize experts), and a data mining function. The functions and order of operations of the functional block diagram 600 may vary. For example, the secondary search engine 602 may be configured to perform the initial search performed by the initial search engine 608. The functions of the secondary search engine 602 may be implemented by the selector/optimizer component 344, the machine learning engines 341, the artificial intelligence engines 340, other component(s), or any combination thereof. Further, the yield management system 604 may be one possible example of the yield management system 346 of FIG. 3, or another yield management system.

Figure 7:
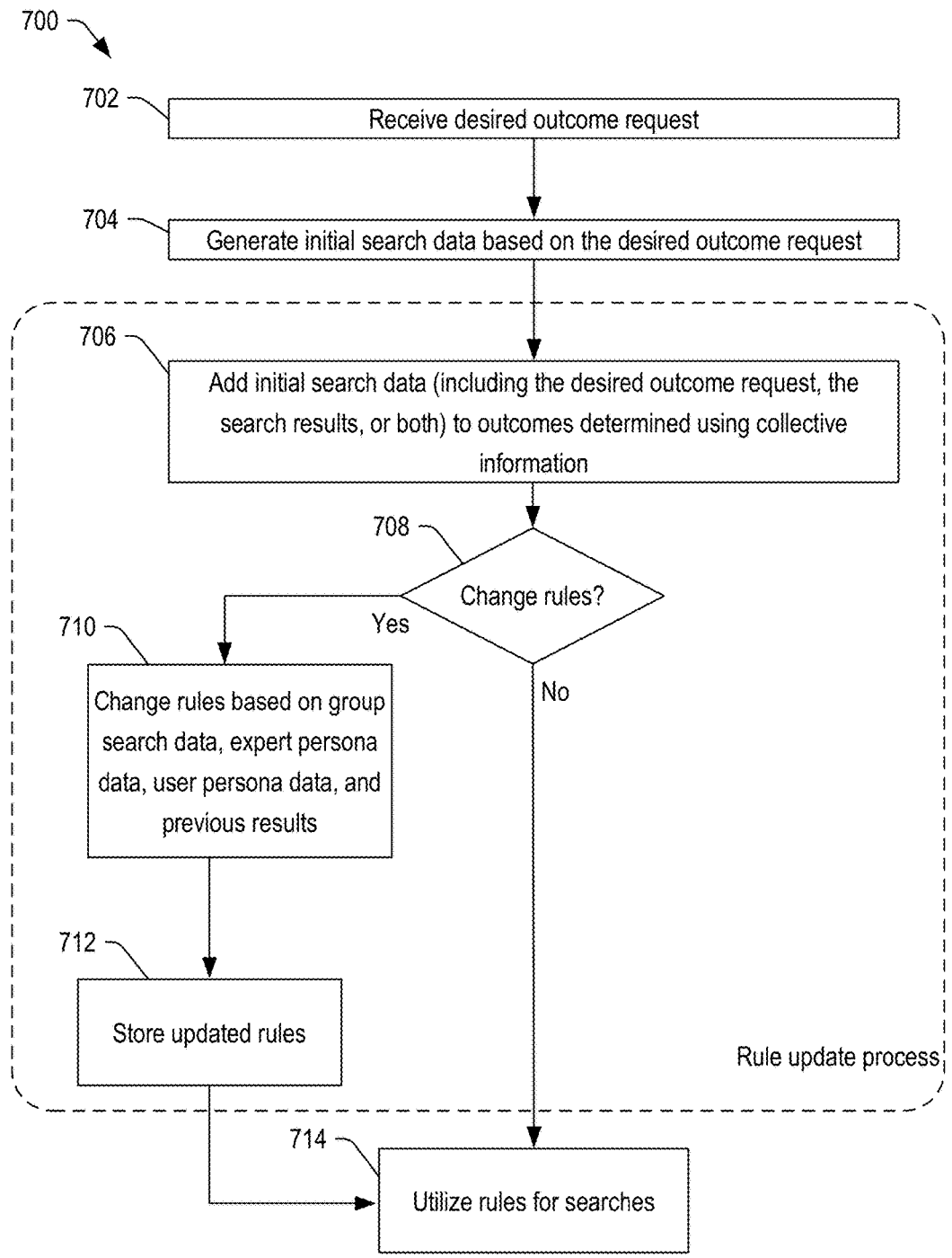
FIG. 7 is a flowchart of a method of determining yield management rules in a collective intelligence experience system, in accordance with certain embodiments of the present disclosure.

Referring to FIG. 7 a flowchart of a method of determining yield management rules in a collective intelligence experience system is shown and generally designated 700. The method 700 may be implemented by the systems described above with respect to FIGS. 1-6 to allow an experiential system to update yield management rules based on collective intelligence, client feedback, other data, or any combination thereof. The method 700 can determine yield management rules, which may be used to provide a client with "better" or "best" searches and with "better" or "best" search results. The "better" or "best" search may be based on collective information from other searches and from interactions by other users. The "better" or "best" search results may be based on a client's query, desired outcome or outcomes, previous search results, the yield management rules, group search results, other data, or any combination thereof.

The method 700 can include receiving a desired outcome request, at 702. In some examples, the outcome request may be a query received from a client or from a computing device, which request may be generated autonomously, such as via an artificial intelligence agent. The method 700 can include generating initial search data based on the desired outcome request, at 704. In some embodiments, the system may suggest "better" search terms or "better" searches. In some embodiments, the system may provide suggested searches and may indicate the types or quantity of outcomes identified if such suggested searches are performed. In some embodiments, the system may perform the suggested searches concurrently with the performance of the user's query. In some embodiments, the initial search data can include an initial search result, the desired outcome request, or both. Both of the operations 702 and 704 may trigger a yield management system update process, although there may be other triggers. The yield management update process may include verifying that the inventory data is not stale.

The method 700 can include adding the initial search data to outcomes determined using collective information, at 706. The outcomes determined using the collective information can include queries and search results for multiple clients from multiple prior searches, as well as evaluation data based on user interactions with such search results. Further, the method 700 can include determining if yield management rules should be changed, at 708. In some embodiments, the yield management rules may be changed based on data determined from searches and search results over time. If a particular day for travel has consistently lower prices than other days, the yield management rules may be adjusted to check costs for flights using that "low price" day as an alternative search, for example (by rule). In some examples, the rules may be changed if the rules are no longer consistent with the collective information. In some embodiments, rather than changing the rules, the system may adjust the rules based on the collective information. Further, the system may generate reports that can be reviewed by an administrator based on how the rules are functioning. If the rules should be changed, the method 700 may include changing the rules based on group search data, collective information, expert persona data, user persona data, and previous results, at 710. The new or updated rules may be stored, at 712. The rules may be utilized for searches, at 714.

Figure 8:
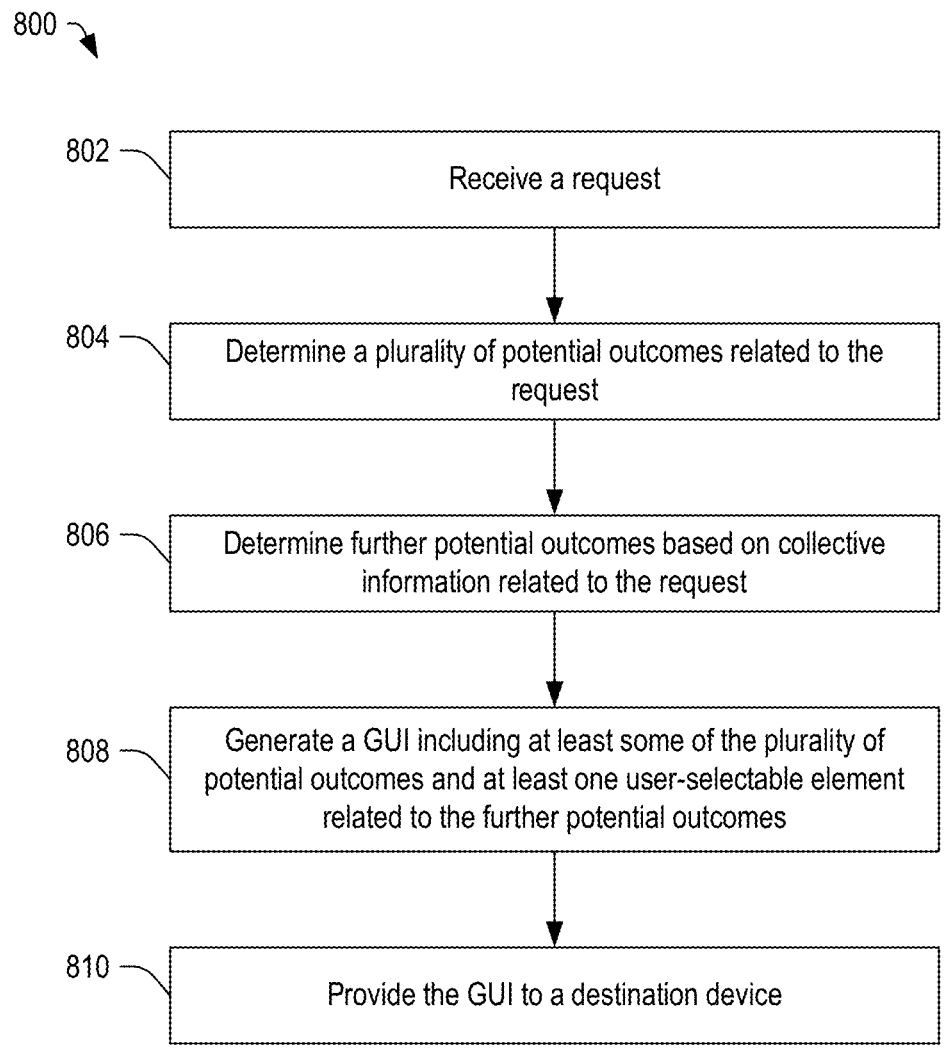
FIG. 8 is a flow diagram of a method of providing a collective intelligence experience system, in accordance with certain embodiments of the present disclosure.

FIG. 8 is a flow diagram of a method 800 of providing a collective intelligence experience system, in accordance with certain embodiments of the present disclosure. The method 800 may be used with any of the systems described above with respect to FIGS. 1-6.

At 802, the method 800 may include receiving a request. The request may be received at the input interface (such as a graphical user interface) of a client device. The method 800 may further include determining a plurality of potential outcomes related to the request, at 804. In some embodiments, the collective intelligence experience system may determine the plurality of potential outcomes by searching inventory.

The method 800 may further include determining further potential outcomes based on collective information related to the request, at 806. The potential outcomes may be determined from prior searches or from performing a search based on collective information. The collective information may include searches that were previously performed and that resulted in successful outcomes.

The method 800 may also include generating a graphical user interface (GUI) including at least some of the plurality of potential outcomes and at least one user-selectable element related to the further potential outcomes, at 808. In some embodiments, the further potential outcomes may be presented with the client interface as a suggested "better" search and information about the corresponding results (such as a number of possible outcomes if the search were to be performed). In some embodiments, the further potential outcomes may be presented at the time that the request is received (at 802, such as while the user is typing the request into the interface). In such an example, determining the plurality of potential outcomes (804), determining further potential outcomes (806), and generating the GUI (808) may occur simultaneous with or substantially concurrent with receiving the request (802). In some embodiments, the GUI may include at least some of the potential outcomes (weighted, ranked, filtered, or otherwise processed according to a selected persona) and may include one or more user-selectable options to access further potential outcomes ("better" searches, or other information).

The method 800 may further include providing the GUI to a destination device, at 810. In some embodiments, the destination device may be a computing device that is the source of the request, such as a smart phone, a laptop computer, a tablet computer, a desktop computer, another computing device, or any combination thereof. The destination device may be a user-operated device or an automated device.

Figure 9:
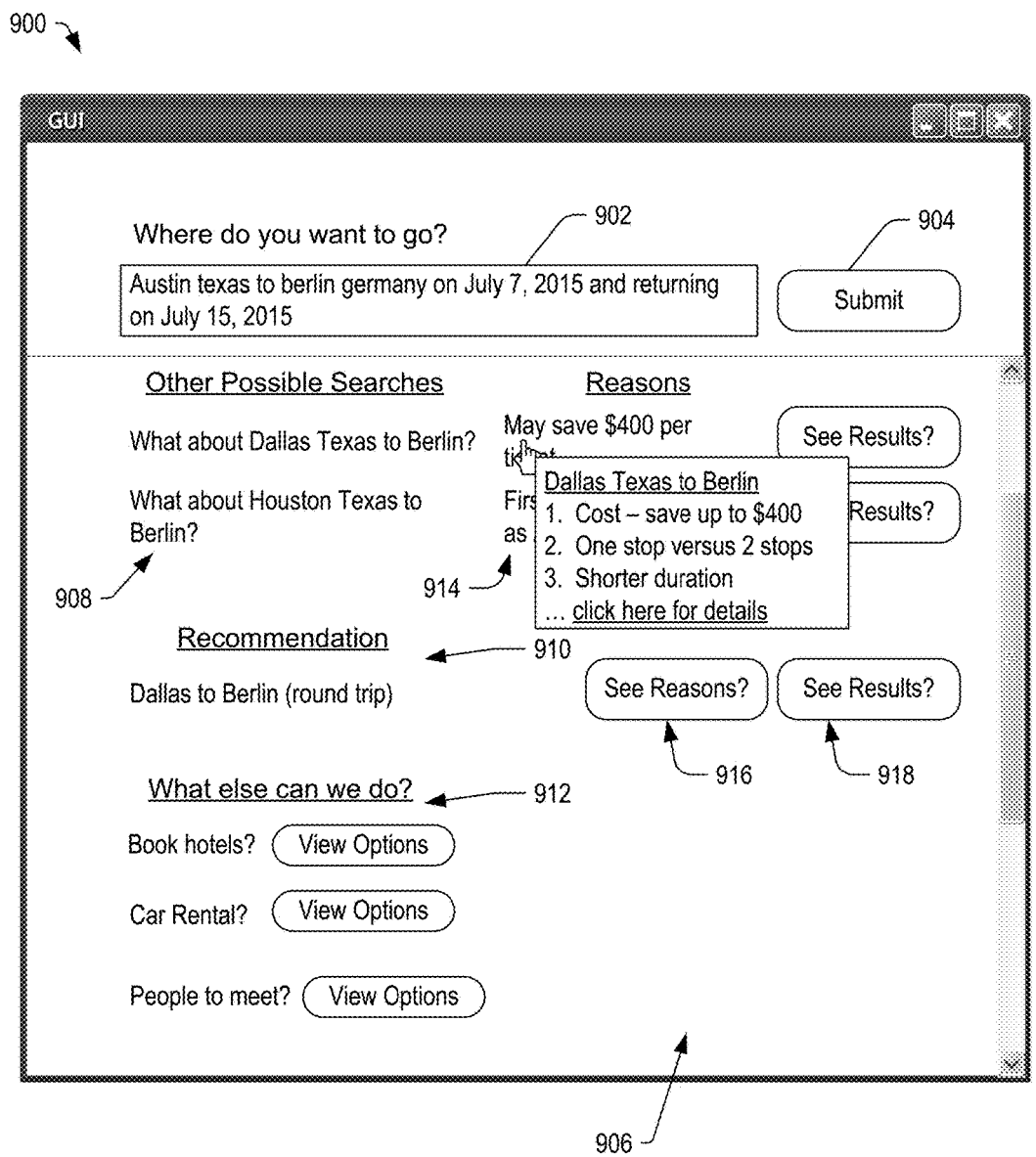
FIG. 9 is a diagram of a graphical user interface configured to provide outcomes, in accordance with certain embodiments of the present disclosure.

FIG. 9 is a diagram of a GUI 900 configured to provide outcomes, in accordance with certain embodiments of the present disclosure. The GUI 900 may include a text field 902 to receive a text input, such as a natural language input, as well as a plurality of user-selectable elements, such as buttons, check boxes, radio buttons, clickable links, pull-down menus, tabs, clickable images, other elements, or any combination thereof. The GUI 900 may include a button 904 (labeled "Submit") for sending input from the text field 902 to the collective intelligence experience system for further processing.

In some embodiments, as the user interacts with the text field 902, data may be exchanged between the GUI 900 and the collective intelligence experience system. In response to the data from the GUI, the collective intelligence experience system may identify "better" searches based on collective information and may provide information related to the "better" searches to the GUI 900 for presentation.

In some embodiments, the GUI 900 may include further information in a recommendations panel 906 including a list 908 of other possible searches, which may be better than that entered by the user. The GUI 900 may further include reasons 914 why the other searches in the list 908 may be better and a selectable element labeled "See Results?", which may be selected by a user to view the results if the particular search is selected. By moving a pointer over one of the reasons, a pop-up window may be displayed which may list one or more reasons why the search may be better and which may provide a selectable element (such as a link) that can be selected by a user to access a more detailed explanation.

In some embodiments, the GUI 900 may include a recommendation 910 of a particular search option. In some embodiments, the recommendation 910 may include a set of reasons or a detailed explanation, which may be accessed by selecting a "See Reasons?" button 916. Further, the recommended search and its results may be accessed by clicking the "See Results?" button 918. In some embodiments, the reasons may be presented in a separate list or which may be presented via a popup window when the user locates the pointer over the recommendation 910. In other embodiments, the buttons 916 and 918 may be omitted.

In some embodiments, the GUI 900 may include further options 912. In the illustrated example, the further options 912 are listed below a heading of "What else can we do?" In the illustrated example, the GUI 900 presents options for booking a hotel, renting a car, meeting people, etc. With respect to the "People to meet?" option, the user may share his or her social or work contacts, schedule information, and other information with the collective intelligence experience system, which may analyze the shared information to identify potential opportunities to meet or to identify scheduled meetings. Selecting the "View Options" button may cause the GUI to present information related to possible or existing meeting schedules and may provide further options for facilitating such meetings. In a particular example, selecting the "View Options" associated with the "People to meet?" label may cause the GUI 900 to communicate with the collective intelligence experience system to identify a travel option that includes a layover long enough for the user to meet with one or more of his or her contacts. Other features are also possible.

In some embodiments, the GUI 900 may present "better" search options 908, reasons for selecting such options 914, and recommendations 910 automatically as the user enters his or her request into the text field, while the collective intelligence experience system is processing the request, after the collective intelligence experience system has provided results from searching based on the request, or any combination thereof. In some embodiments, the text field may be replaced with multiple user-selectable data entry elements, which may be of the same or different types.

Figure 10:
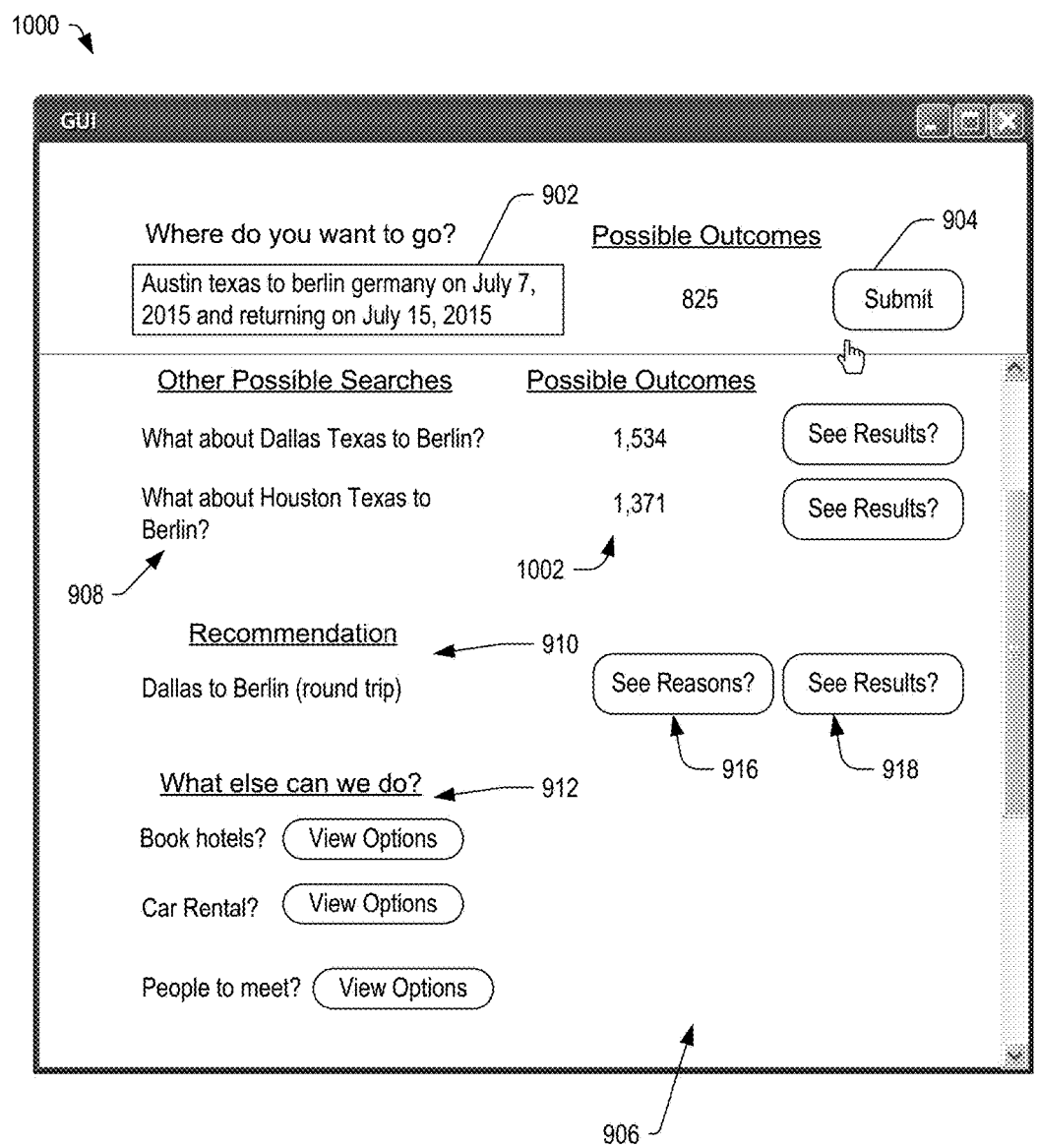
FIG. 10 is a diagram of a second graphical user interface configured to provide outcomes, in accordance with certain embodiments of the present disclosure.

FIG. 10 is a diagram of a second GUI 1000 configured to provide outcomes, in accordance with certain embodiments of the present disclosure. The GUI 1000 may include all of the elements of the GUI 900 of FIG. 9, except that the reasons 914 may be replaced with possible outcomes 1002, which possible outcomes may include a number of options found that meet the criteria specified in the text input 902. In some embodiments, locating the pointer over one of the "possible outcomes" may cause the GUI 1000 to display reasons why that set of outcomes may be "better" for the particular user. Other options are also possible.

In the above embodiments, examples of searches have been discussed. Most of the examples have focused on travel-related searching, in part, because such searches are easy for most people to understand. However, the collective intelligence experience system may be used with other types of searches, such as health care searches, product searches, and so on. The collective intelligence experience system may be configured for a particular industry, product, or service, and may be able to make intelligent guesses regarding "better" and "best" searches and search results based in part on its configuration and based on collective information that it derives from prior searches and user activities.

In conjunction with the systems, methods, devices and interfaces described above with respect to FIGS. 1-10, a collective intelligence experience system may include a processor and a memory accessible to the processor. The memory may be a memory device (volatile or non-volatile) configured to store instructions that, when executed, cause the processor to utilize collective information derived from prior searches, user interactions with search results, and so on. The processor may use the collective information to determine "better" searches, to predict "better" results, and so on. In some embodiments, the system may make recommendations and explain why a search is "better" while the user is typing his or her search into a search field of a GUI. In some embodiments, the system may provide an indication of the type, quantity or other factors corresponding to the "better" search to assist the client in making a decision.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method for implementing a collective intelligence experience, the method comprising:
  receiving input data at an interface of a computing system, the input data corresponding to a search initiated by a consumer;
  automatically determining one or more parameters associated with the consumer based in part on the input data;
  selecting one or more digital personas from a plurality of digital personas based on the one or more parameters, the one or more digital personas including a first digital persona, a second digital persona, and a third digital persona, the first digital persona representing at least one first characteristic of the consumer, the second digital persona representing at least one second characteristic of the consumer, the third digital persona representing one or more characteristics of a group of consumers;
  generating one or more instantiations of an artificial intelligence engine for each of the one or more digital personas, the one or more instantiations including a first instantiation, a second instantiation, and a third instantiation;
  initializing each of the one or more instantiations with a selected one of the one or more digital personas, the first instantiation initialized with the first digital persona, the second instantiation initialized with the second digital persona, the third instantiation initialized with the third digital persona;
  determining, using the third instantiation, one or more recommended searches from historical data associated with a plurality of other consumers using the artificial intelligence engine, from one or more outcomes inferred by the artificial intelligence engine based on the input data, and from one or more yield management rules determined from historical data, the one or more recommended searches including search logic having previously identified inventory items of interest to other consumers having similar parameters to the one or more parameters associated with the consumer as represented by the third digital persona;
  determining, based on the input data, a first set of searches using the first instantiation, a second set of searches using the second instantiation, and a third set of searches using the third instantiation, the third set of searches including the one or more recommended searches;
  providing a graphical user interface including data related to the first set, the second set, and the third set, the graphical user interface including one or more search results based on at least one of the input data and the one or more recommended searches and including at least one user-selectable element accessible by the consumer to access search logic and associated outcomes derived from collective intelligence experience of other users' interactions with the computing system.

2. The method of claim 1, further comprising:
  generating the collective information based on search data and successful outcomes from multiple users; and
  determining the one or more recommended searches based on the collective information.

3. The method of claim 1, further comprising providing the recommended search and associated data representing potential outcomes within the graphical user interface.

4. The method of claim 1, further comprising:
  providing the interface to a client device;
  receiving the input data at the interface; and
  providing one or more recommended searches within the interface in response to receiving the input data.

5. The method of claim 1, further comprising generating the collective information based on prior searches, user selections, and feedback from a plurality of users.

6. The method of claim 1, further comprising determining an intention based on the input data, the one or more recommended searches determined based on the intention.

7. The method of claim 1, further comprising including at least one result determined by a yield management system based on one or more yield management rules.

8. The method of claim 1, further comprising providing advice about which of the one or more recommended searches a client should select.

9. A system comprising:
an interface configured to communicate with one or more remote devices through a communications network;
a processor coupled to the interface; and
a memory accessible to the processor and including instructions that, when executed, cause the processor to:
receive data corresponding to an input from the interface;
determine one or more parameters of a consumer associated with the input;
select a first digital persona from a plurality of digital personas, the first digital persona representing one or more characteristics of a consumer;
select a second digital persona from the plurality of digital personas, the second digital persona representing one or more characteristics of a group of consumers;
configure a first instantiation of an artificial intelligence engine with the first digital persona;
configure a second instantiation of the artificial intelligence engine with the second digital persona;
search one or more data sources based on the received data to receive results;
process the results using the first instantiation to determine a first set of results;
determine collective information, using the second instantiation, the collective information including search logic of a plurality of searches by other consumers having similar parameters to the one or more parameters associated with the consumer as represented by the second digital persona, the determined search logic having been performed previously to identify inventory items of interest to the other consumers;
automatically analyze the collective information using the second instantiation of the artificial intelligence engine to determine one or more recommended searches based on the collective information in response to receiving the data; and
generate, using a graphical user interface module, an interface including the first set of results and including at least one user-selectable element accessible by a user to view the one or more recommended searches, the interface further including data representing possible outcomes of the one or more recommended searches.

10. The system of claim 9, further comprising the memory includes instructions that, when executed, cause the processor to:
receive an input corresponding to selection of one of the one or more recommended searches; and
provide search results to the interface including search results corresponding to the selection.

11. The system of claim 9, wherein the data representing possible outcomes comprises a number of available options that may be accessed in response to selection of one of the one or more recommended searches.

12. The system of claim 9, the data representing possible outcomes comprises an explanation of available options that may be accessed in response to selection of one of the one or more recommended searches.

13. The system of claim 9, wherein the associated recommendation comprises one or more reasons why a user should select one of the one or more searches as being better than the input.

14. The system of claim 9, wherein the memory further includes instructions that, when executed, cause the processor to:
receive a query corresponding to the input;
identify first search results based on the query; and
identify second search results based on at least one of the one or more recommended searches.

15. The system of claim 14, wherein the memory includes instructions that, when executed, cause the processor to provide the first search results and the second search results to the interface.

16. A computer readable memory device including instructions that, when executed, cause a processor to perform a method comprising:
generating an interface including one or more selectable elements accessible by a user to provide a user input;
receiving data corresponding to an input;
determining one or more parameters associated with the user based in part on the input data;
selecting digital personas from a plurality of digital personas, the digital personas including a first digital persona representing one or more characteristics of a consumer and including a second digital persona representing one or more characteristics of a group of consumers;
initializing instantiations of an artificial intelligence engine with the digital personas including a first instantiation initialized with the first digital persona and a second instantiation initialized with the second digital persona;
searching one or more data sources based on the received data to determine results;
evaluating, using the initialized instantiations, the results to produce a set of results for each of the initialized instantiations;
selecting first search results for the user based on the first instantiation initialized with the first digital persona associated with the user;
determining, using the second instantiation of the artificial intelligence engine, search logic of a plurality of searches from collective information including historical data associated with a plurality of other consumers, one or more outcomes inferred by the artificial intelligence engine based on the input data, and yield management rules determined from historical data;
automatically processing the search logic using the second instantiation of the artificial intelligence engine to determine one or more recommended searches related to the data and based on collective information other than the input; and
providing a results interface including the selected search results and including the one or more recommended searches and associated information from the artificial intelligence engine.

17. The computer readable memory device of claim 16, wherein the associated information comprises a recommendation indicating which of the one or more recommended searches should be selected.

18. The computer readable memory device of claim 17, wherein the associated information further comprises one or more reasons for the recommendation.

19. The computer readable memory device of claim 17, wherein the associated information further comprises a number of available options associated with each of the one or more recommended searches.

20. The computer readable memory device of claim 16, further including instructions that, when executed, cause a processor to perform the method further comprising:
  providing an interface to a destination device that includes at least one of first search results related to the user input and second search results related to at least one of the one or more recommended searches.

\* \* \* \* \*